United States Patent [19]
Chigira et al.

[11] Patent Number: 5,831,671
[45] Date of Patent: Nov. 3, 1998

[54] IMAGE BLUR PREVENTION APPARATUS UTILIZING A STEPPING MOTOR

[75] Inventors: Tatsuo Chigira; Masami Sugimori, both of Yokohama, Japan

[73] Assignee: Canon Kabushiki Kaisha, Tokyo, Japan

[21] Appl. No.: 552,163

[22] Filed: Nov. 2, 1995

Related U.S. Application Data

[63] Continuation of Ser. No. 118,734, Sep. 9, 1993, abandoned.

[30] Foreign Application Priority Data

| Sep. 10, 1992 | [JP] | Japan | 4-266794 |
| Oct. 19, 1992 | [JP] | Japan | 4-304396 |
| Oct. 19, 1992 | [JP] | Japan | 4-304397 |
| Oct. 30, 1992 | [JP] | Japan | 4-292547 |
| Oct. 30, 1992 | [JP] | Japan | 4-314411 |
| Nov. 18, 1992 | [JP] | Japan | 4-331207 |

[51] Int. Cl.⁶ .................................................. H04N 5/228
[52] U.S. Cl. ................................ 348/208; 396/55; 396/90
[58] Field of Search ........................... 348/207, 208, 348/214, 221, 335, 345, 373; 354/430, 439; 396/90, 421, 52, 55

[56] References Cited

U.S. PATENT DOCUMENTS

| 4,623,930 | 11/1986 | Oshima et al. | 358/222 |
| 4,755,880 | 7/1988 | Haenel et al. | 358/213.11 |
| 4,780,739 | 10/1988 | Kawakami et al. | 354/430 |
| 5,150,260 | 9/1992 | Chigira | 359/694 |
| 5,170,255 | 12/1992 | Yamada et al. | 358/222 |
| 5,282,044 | 1/1994 | Misawa et al. | 348/208 |
| 5,335,032 | 8/1994 | Onnki et al. | 348/208 |

FOREIGN PATENT DOCUMENTS 3276981  12/1991  Japan .

*Primary Examiner*—Bipin Shalwala
*Attorney, Agent, or Firm*—Fitzpatrick, Cella, Harper & Scinto

[57] ABSTRACT

An image-blur prevention apparatus includes a vibration detection unit for detecting a vibration state, an image-blur correction unit for correcting an image blur, an open-loop controllable driving unit for driving the image-blur correction unit, and a control unit for open-loop controlling the driving unit in accordance with an output from the vibration detection unit.

7 Claims, 26 Drawing Sheets

| FIG. 4A |
| FIG. 4B |

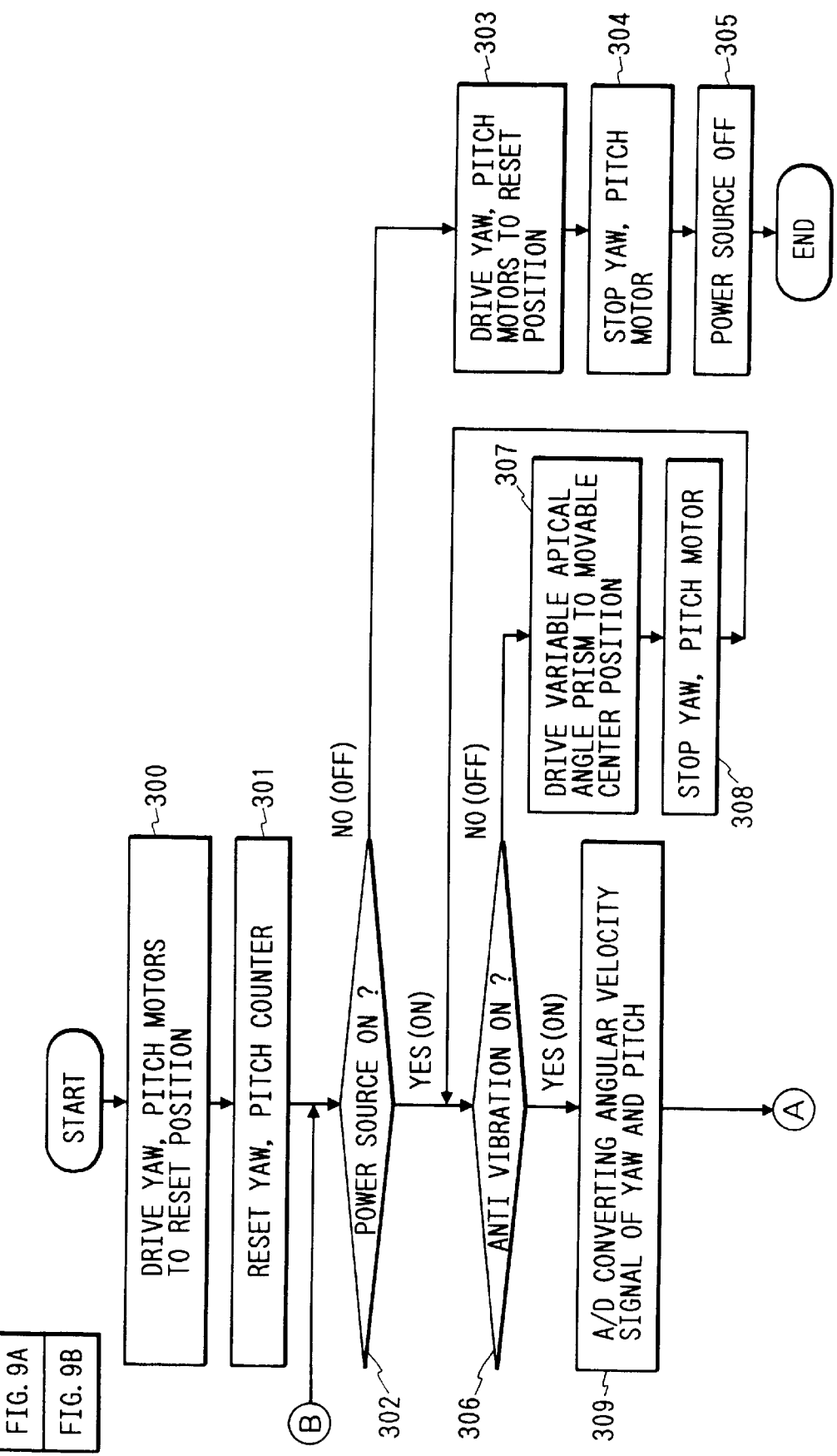

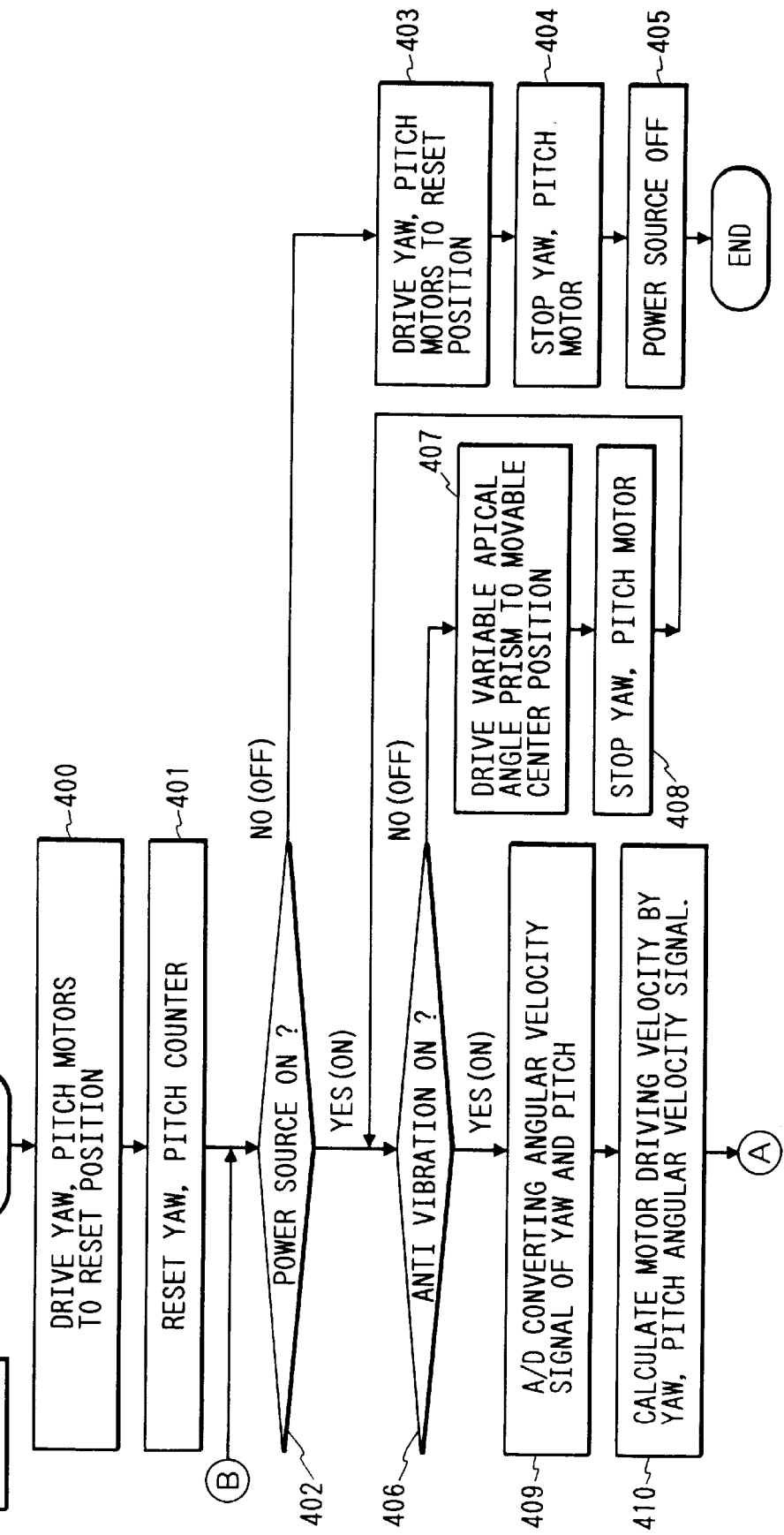

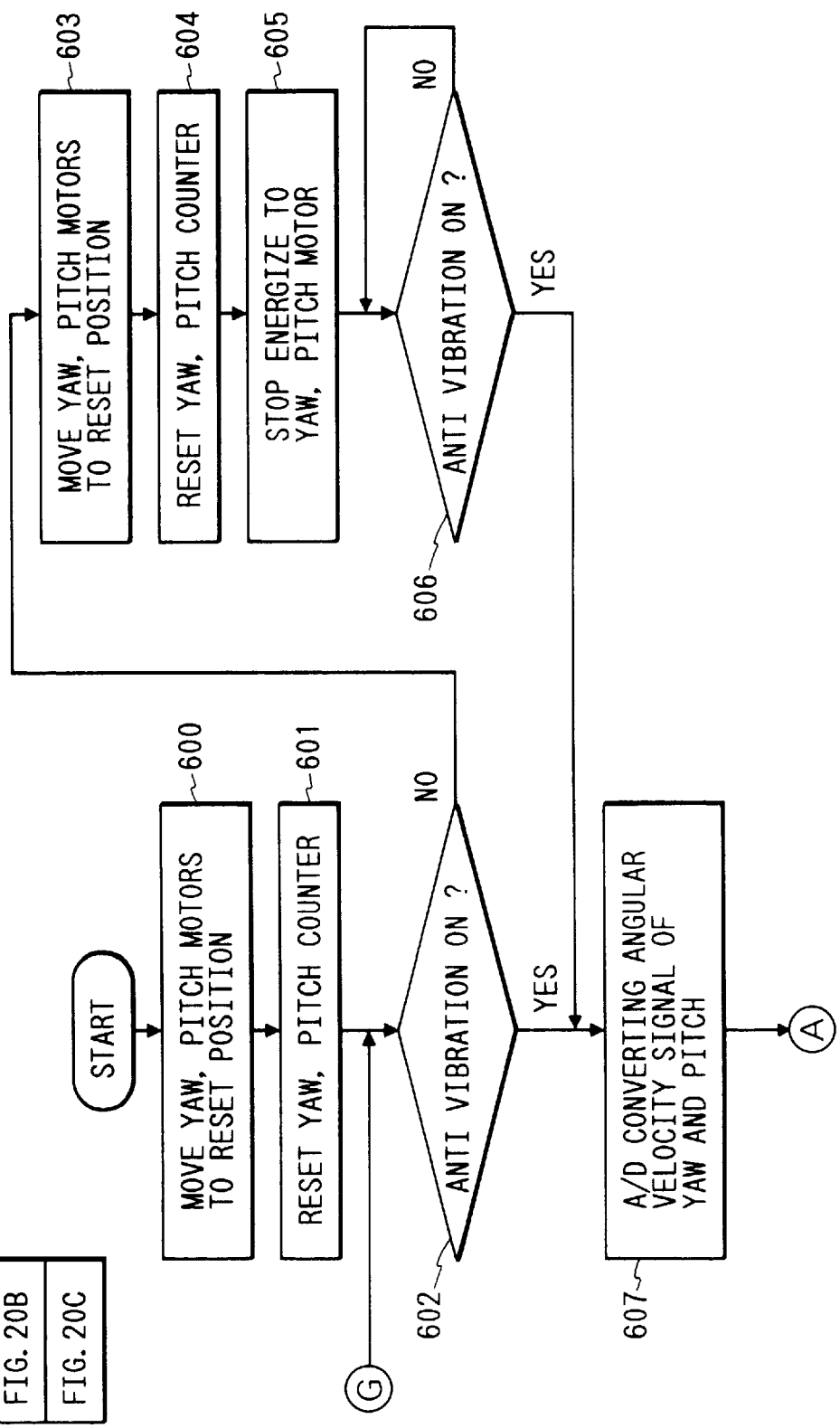

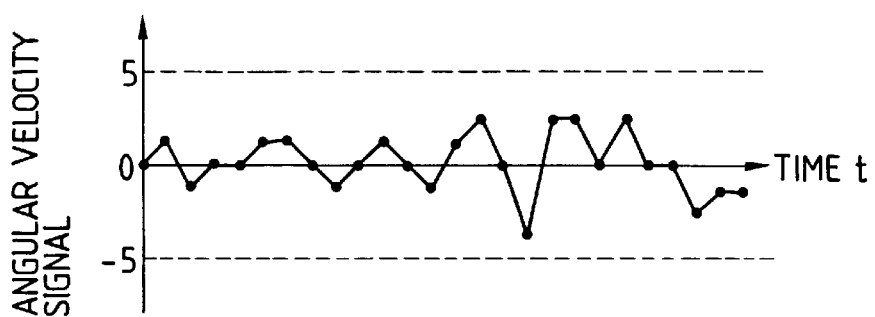

IMAGE BLUR PREVENTION APPARATUS UTILIZING A STEPPING MOTOR

This application is a continuation of application Ser. No. 08/118,734 filed Sep. 9, 1993 now abandoned.

BACKGROUND OF THE INVENTION

1. Field of the Invention

The present invention relates to an image-blur prevention apparatus for preventing an image blur caused by, e.g., a camera shake.

2. Related Background Art

In recent years, especially, video cameras comprising an anti-vibration device for preventing a vibration such as a camera shake from influencing a recorded image have become popular.

As an example of an anti-vibration device of this type, U.S. Pat. No. 4,623,930 is known. An anti-vibration device disclosed in this patent corrects a camera shake by electrically processing it. More specifically, a video camera as an image pickup device obtains continuous images by repeating accumulation and output of image signals. In an anti-vibration photographing apparatus (camera) disclosed in U.S. Pat. No. 4,623,930, movement of an image is detected by comparing an image signal obtained on an image pickup device of the camera with the previously obtained image signal so as to detect a camera shake, and a range for picking up the image signal on the image pickup device is changed, thereby obtaining an image signal free from the influence of the camera shake.

Also, the present applicant proposed various anti-vibration devices for correcting an image blur caused by a camera shake using optical correction means.

An anti-vibration device of this type normally comprises, for example, a variable apical angle prism as optical correction means, a vibration sensor for detecting a vibration applied to, e.g., a video camera in which this device is arranged, an actuator for changing the apical angle (deviation amount with respect to the movable center) of the variable apical angle prism, a deviation detection sensor for detecting the apical angle of the variable apical angle prism, and a control circuit for calculating a driving signal of the variable apical angle prism on the basis of data of a vibration direction and a vibration amount detected by the vibration sensor, and driving the actuator.

However, in the anti-vibration apparatus for electrically performing image-blur correction, as disclosed in U.S. Pat. No. 4,623,930 described above, since a signal obtained within a predetermined range on the image pickup device is used as an image signal, all the elements on the image pickup device cannot be used, and this fact is equivalent to a decrease in density of the image pickup device, thus deteriorating quality of the obtained image.

In the latter anti-vibration apparatus for optically performing image-blur correction, since an oscillation tends to occur if followability to a vibration is to be improved, it is difficult to obtain high followability to a vibration.

Furthermore, in the latter anti-vibration device comprising the variable apical angle prism as the optical correction means, the variable apical angle prism is directly mechanically connected to a coil, and the apical angle of the variable apical angle prism is changed by an electromagnetic force acting between the coil and a permanent magnet fixed to a lens barrel when the coil is energized. For this reason, even when the camera is used while disabling the anti-vibration function, control (electrical lock) for continuously supplying a current to maintain the apical angle in a predetermined state (to hold the apical angle at the movable center) so that the apical angle of the variable apical angle prism is not changed by an externally applied vibration is necessary, and consequently, battery consumption is increased.

In order to avoid wasteful consumption of the battery, and to maintain the apical angle of the variable apical angle prism in a predetermined state when the anti-vibration function is disabled, a lock mechanism (mechanical lock means) may be provided. However, when such a lock mechanism is arranged, the camera which mounts the device becomes large in size accordingly, thus disturbing portability.

SUMMARY OF THE INVENTION

One aspect of the invention is to provide an image-blur prevention apparatus comprising vibration detection means for detecting a vibration state, image-blur correction means for correcting an image blur, open-loop controllable drive means for driving the image-blur correction means, and control means for open-loop controlling the driving means in accordance with the output from the vibration detection means. With this arrangement, followability of an operation of the image-blur correction means with respect to a vibration can be improved without causing an oscillation in an anti-vibration operation. Also, with the above arrangement, when the anti-vibration device employs a movable optical member as the image-blur correction means, if the anti-vibration operation is disabled, the optical member can be held without arranging any electrical or mechanical holding means for fixing the optical member in position, thus achieving a compact device and energy saving.

Furthermore, one aspect of the invention is to provide an image-blur prevention apparatus comprising means for controlling the driving velocity of a stepping motor for driving image-blur correction means in accordance with an output from vibration detection means, whereby the stepping motor can substantially continuously operate without repeating driving and stopping operations, and the image-blur correction means can be smoothly and continuously operated.

Moreover, one aspect of the invention is to provide an image-blur prevention apparatus comprising means for controlling a minimum driving control amount of image-blur correction means by driving means in accordance with a pixel pitch of an image pickup device, which is subjected to image-blur correction by the image-blur correction means, thereby allowing a smooth, natural operation of the image-blur correction means.

Moreover, one aspect of the invention is to provide an image-blur prevention apparatus comprising image-blur correction means for correcting the image-blur in accordance with the output from a vibration detection means, and prohibition means for prohibiting the operation of the image-blur correction means depending on the output of the vibration detection means, wherein, with the above structure, it is arranged to prohibit any image-blur correction for the output from the vibration detection means requiring no image-blur correction at all (the noise level output of the vibration detection means, for example), thus making it possible to avoid any unnecessary operation of the image-blur correction means for the achievement of the dissipation power saving.

BRIEF DESCRIPTION OF THE DRAWINGS

FIG. 24 is a chart showing an angular velocity signal obtained by the anti-vibration device shown in FIG. 23;

FIGS. 25A and 25B show an angular deviation signal obtained by integrating the angular velocity signal shown in FIG. 24, and an angular deviation signal actually used for driving a motor.

DETAILED DESCRIPTION OF THE PREFERRED EMBODIMENTS

The illustrated embodiments of the present invention will be described in detail hereinafter.

(First Embodiment)

Figure 1:
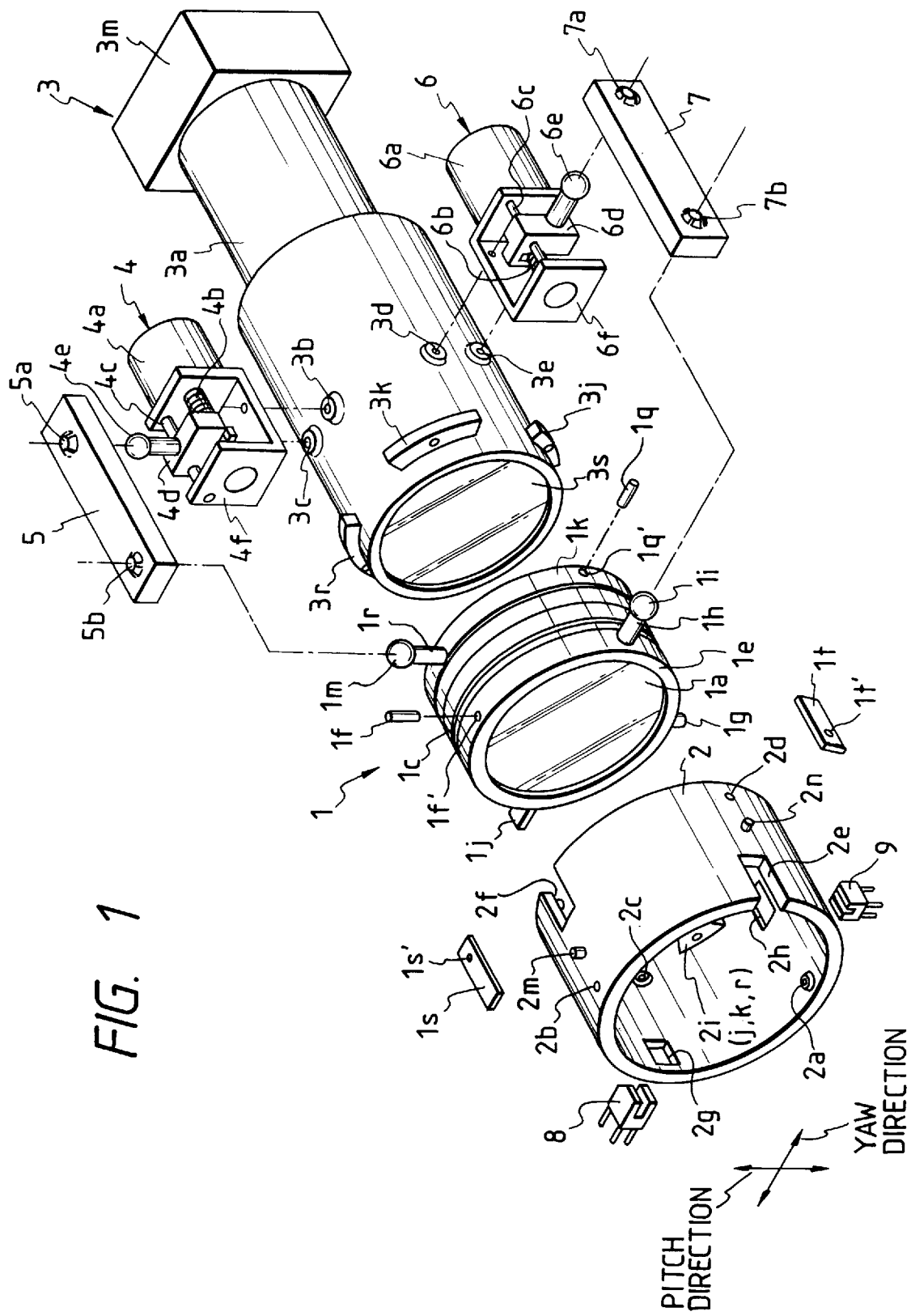
FIG. 1 is an exploded perspective view showing a mechanical arrangement of an anti-vibration device according to the first embodiment of the present invention.
Figure 2:
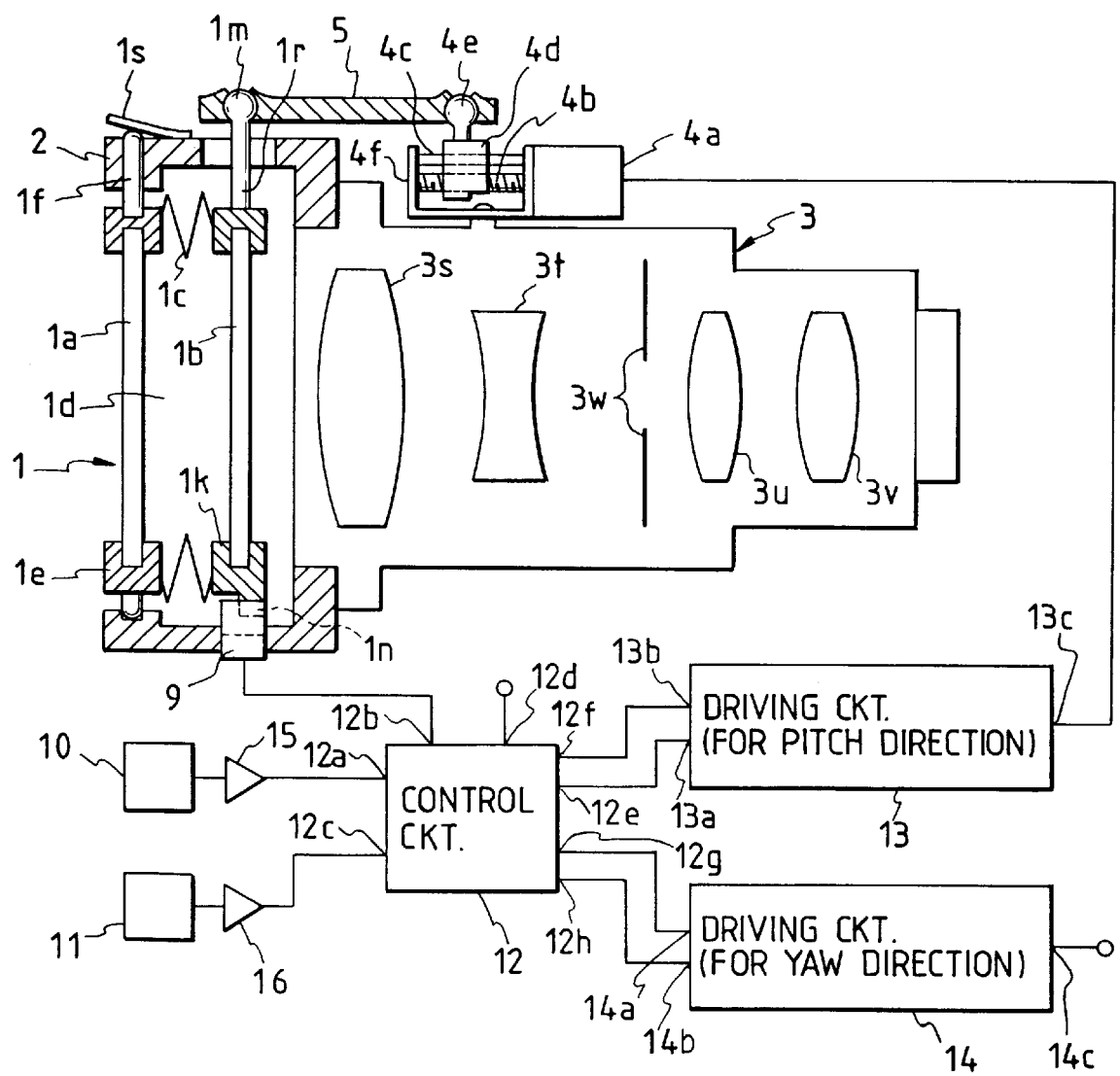
FIG. 2 is a sectional view of the anti-vibration device shown in FIG. 1 and a block diagram showing electrical blocks thereof.
Figure 3:
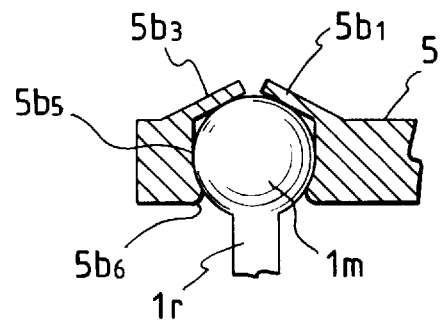
FIG. 3 is a sectional view showing the relationship between a power transmission lever (FIG. 1) and a projecting portion of a variable apical angle prism.

FIGS. 1 to 5 show an anti-vibration device according to the first embodiment of the present invention. FIG. 1 is an exploded perspective view showing a mechanical arrangement of the anti-vibration device, FIG. 2 shows a section and electrical blocks of the anti-vibration device, FIG. 3 is a sectional view of main part of a power transmission portion shown in FIG. 1, and FIGS. 4A, 4B and 5 are flow charts showing an operation of the anti-vibration device of this embodiment.

The mechanical arrangement will be described below with reference to FIGS. 1 to 3.

The anti-vibration device comprises a variable apical angle prism 1, a cover 2, a photographing lens 3, a first stepping motor 4, a first power transmission lever 5, a second stepping motor 6, a second power transmission lever 7, a first photointerrupter 8, and a second photointerrupter 9.

The variable apical angle prism 1 is constituted by a first glass plate 1a, a second glass plate 1b, a bellows 1c, a first holding lens barrel 1e, and a second holding lens barrel 1k. A transparent liquid 1d such as silicone oil is filled in an internal space closed by the first and second glass plates 1a and 1b, the bellows 1c, and the first and second holding lens barrels 1e and 1k.

The first holding lens barrel 1e is formed by molding, e.g., a polycarbonate resin, and has a substantially ring shape. A first shaft 1g, a first projecting portion 1h, a first hole 1f for receiving a second shaft 1f, and a second projecting portion 1j are formed on the outer peripheral portion of the first holding lens barrel 1e, and a distal end portion 1i of the first projecting portion 1h has a spherical shape. The first and second projecting portions 1h and 1j are formed in a direction substantially perpendicular to an axis connecting the first shaft 1g and the first hole 1f.

The second holding lens barrel 1k is formed by molding, e.g., a polycarbonate resin, and has a substantially ring shape. A second hole 1q' for receiving a fourth shaft 1q, a third shaft 1p (not shown; formed at a position opposing the fourth shaft 1q as in the positional relationship between the first and second shafts 1g and 1f), a third projecting portion 1r, and a fourth projecting portion in (not shown; formed at a position opposing the third projecting portion 1r as in the positional relationship between the first and second projecting portions 1h and 1j) are formed on the outer peripheral portion of the second holding lens barrel 1k, and a distal end portion 1m of the third projecting portion 1r has a spherical shape. The third and fourth projecting portions 1r and 1n are formed in a direction substantially perpendicular to an axis connecting the third shaft 1p (not shown) and the fourth shaft 1q.

The bellows 1c consists of, e.g., a polyethylene resin, and has a so-called bellows shape.

The first glass plate 1a consisting of a transparent glass is fixed by adhesion to the first holding lens barrel 1e so as not to form any gap therebetween, and the second glass plate 1b consisting of a transparent glass plate is fixed by adhesion to the second holding lens barrel 1k so as not to form any gap therebetween. One end of the bellows 1c is adhered to the first holding lens barrel 1e so as not to form any gap therebetween, and the other end thereof is adhered to the second holding lens barrel 1k so as not to form any gap therebetween. Therefore, as described above, a closed space is defined by the first holding lens barrel 1e, the first glass plate 1a, the bellows 1c, the second holding lens barrel 1k, and the second glass plate 1b, and the liquid 1d such as a silicone oil is filled in the space.

The cover 2 consists of, e.g., a polycarbonate resin, and has a substantially ring shape. The cover 2 has a first bearing portion 2a, a second bearing portion 2b, a third bearing portion 2c, a fourth bearing portion 2d, a first slit portion 2e, a second slit portion 2f, a first hole 2g, a second hole 2h, first to fourth mounting ribs 2i, 2j, 2k, and 2r (the ribs 2j, 2k, and 2r have the same shape as that of the rib 2i, and are not shown in FIG. 1), and first and second pins 2m and 2n.

Each of the first to fourth mounting ribs 2i, 2j, 2k, and 2r has a screw hole. A direction connecting the first and second bearing portions 2a and 2b, and a direction connecting the third and fourth bearing portions 2c and 2d are perpendicular to the optical axis, and are perpendicular to each other.

The first bearing portion 2a is a hole having a predetermined depth, and the second bearing portion 2b is a hole extending through the inner-diameter side and the outer-diameter side of the cover 2. The first bearing portion 2a receives the first shaft 1g of the variable apical angle prism 1, and the second bearing portion 2b receives the second shaft 1f (the second shaft 1f is fixed to the first hole 1f by means of, e.g., press fitting) of the variable apical angle prism 1. In this state, the head portion of the second shaft 1f exposed from the cover 2 via the second bearing portion 2b is biased in its axial direction by a first leaf spring 1s fixed to the cover 2, as shown in FIG. 2. The pin 2m formed on the cover 2 is fitted in a hole 1s' of the first leaf spring 1s, and is fixed by means of, e.g., thermal caulking.

The third bearing portion 2c is a hole having a predetermined depth as in the first bearing portion 2a, and the fourth bearing portion 2d is a hole extending through the inner-diameter side and the outer-diameter side of the cover 2 as in the second bearing portion 2b. The third bearing portion 2c receives the third shaft 1p (not shown) of the variable apical angle prism 1, and the fourth bearing portion 2d receives the fourth shaft 1q (the fourth shaft 1q is fixed to the second hole 1q' by means of, e.g., press fitting) of the variable apical angle prism 1. In this state, the head portion of the fourth shaft 1q exposed from the cover 2 via the fourth bearing portion 2d is biased in its axial direction by a second leaf spring 1s fixed to the cover 2. The pin 2n formed on the cover 2 is fitted in a hole 1t' of the second leaf spring 1t, and is fixed by means of, e.g., thermal caulking.

The first photointerrupter 9 is fitted in the first hole 2g of the cover 2, and is fixed by means of, e.g., adhesion. A slit portion of the first photointerrupter 8 is formed to allow the second projecting portion 1j formed on the first holding lens barrel 1e of the variable apical angle prism 1 to pass therethrough. Also, the projecting portion 1j has dimensions capable of switching between "to shield light" and "not to shield light" between the light-emitting portion and the light-receiving portion of the photointerrupter 8 when the apical angle, in the horizontal direction, of the variable apical angle prism 1 is near 0°.

The second photointerrupter 9 is fitted in the second hole 2h of the cover 2, and is fixed by means of, e.g., adhesion. A slit portion of the second photointerrupter 9 is formed to allow the fourth projecting portion 1n (not shown) formed on the second holding lens barrel 1k of the variable apical angle prism 1 to pass therethrough. Also, the projecting portion 1n has dimensions capable of switching between "to shield light" and "not to shield light" between the light-emitting portion and the light-receiving portion of the photointerrupter 8 when the apical angle, in the horizontal direction, of the variable apical angle prism 1 is near 0°.

With the above-mentioned arrangement, the first holding lens barrel 1e of the variable apical angle prism 1 is axially supported by the cover 2 in substantially the vertical direction via the first and second shafts 1g and 1f, and the second holding lens barrel 1k is axially supported by the cover 2 in substantially the horizontal direction via the third and fourth shafts 1p and 1q. When a force in a direction parallel to the optical axis acts on the first projecting portion 1h of the first holding lens barrel 1e, the apical angle, in the horizontal direction (to be referred to as a yaw angle hereinafter), of the variable apical angle prism 1 changes. Thus, the optical axis is bent in the horizontal direction, and an image on the image pickup device moves in the horizontal direction as well. When a force in a direction parallel to the optical axis acts on the third projecting portion 1r formed on the second holding lens barrel 1k, the apical angle, in the vertical direction (to be referred to as a pitch angle hereinafter), of the variable apical angle prism 1 changes. Thus, the optical axis is bent in the vertical direction, and an image on the image pickup device moves in the vertical direction as well.

The photographing lens 3 is a known one, comprising a lens barrel 3a, photographing optical systems 3s, 3t, 3u, and 3v (see FIG. 2), a diaphragm 3W, a zooming actuator (not shown), and a focusing actuator (not shown).

First to fourth flanges 3i, 3j, 3k, and 3r (3i is not shown) are formed on a front outer peripheral portion of the lens barrel 3a. Each of these first to fourth flanges 3i, 3j, 3k, and 3r has a hole. When screws (not shown) extend through these holes, and are fastened to the screw holes formed in the mounting ribs 2i, 2j, 2k, and 2r (not shown except for 2i) formed on the cover 2, the cover 2 attached with the variable apical angle prism 1 is fixed to the lens barrel 3a. The lens barrel 3a is formed with holes 3b, 3c, 3d, and 3e for fixing the first and second stepping motors 4 and 6, and the first and second stepping motors 4 and 6 are fixed to the holes 3b, 3c, 3d, and 3e via screws. Furthermore, the lens barrel 3a has a CCD holder portion 3m, and a solid-state image pickup device (CCD) is fixed thereto.

The first stepping motor 4 is constituted by a motor portion 4a as a known PM type stepping motor, a lead screw 4b arranged integrally with the rotational shaft of a rotor of the motor portion 4a, a mounting angle 4f having a bearing for axially supporting the lead screw 4b, a guide bar 4c fixed to the mounting angle 4f, and a lead nut portion 4d having a sleeve fitted with the guide bar 4c, and a screw portion fitted with the lead screw 4b. The lead nut portion 4d moves in the optical axis direction according to rotation of the rotor of the motor portion 4a.

The first power transmission lever 5 is formed by molding, e.g., a polyacetal resin, and has a first bearing portion 5a and a second bearing portion 5b.

The first bearing portion 5a axially supports a spherical distal end portion 4e formed on the lead nut portion 4d of the first stepping motor 4 without cluttering, and the second bearing portion 5b axially supports the spherical distal end portion 1m of the third projecting portion 1r formed on the second holding lens barrel 1k of the variable apical angle prism 1 without cluttering.

The relationship between the first and second bearing portions 5a and 5b of the first power transmission lever 5, and the distal end portion 1m of the third-projecting portion 1r of the variable apical angle prism 1 and the spherical distal end portion 4e of the lead nut portion 4d of the first stepping motor 4 will be described below with reference to FIG. 3.

Note that FIG. 3 illustrates only the relationship between the second bearing portion 5b of the power transmission lever 5 and the spherical distal end portion 1m of the third projecting portion 1r of the variable apical angle prism 1. However, the same applies to the relationship between the first bearing portion 5a of the power transmission lever 5 and the spherical distal end portion 4e of the lead nut portion 4d of the first stepping motor 4.

As shown in FIG. 3, first to fourth spring portions $5b_1$, $5b_2$, $5b_3$, and $5b_4$ ($5b_2$ and $5b_4$ are not shown), a spherical sliding portion $5b_5$, and a jaw portion $5b_6$ are formed on the second bearing portion 5b of the power transmission lever 5. The inner diameter of the jaw portion $5b_6$ is smaller by a predetermined amount than the outer diameter of the spherical distal end portion 1m of the third projecting portion 1r of the variable apical angle prism 1, and the diameter of the spherical sliding portion $5b_5$ is the same as that of the spherical distal end portion 1m of the third projecting portion 1r.

With these dimensions, the distal end portion 1m of the third projecting portion 1r of the variable apical angle prism 1 is attached by press fitting to the second bearing portion 5b of the power transmission lever 5. In an assembling state, the first to fourth spring portions $5b_1$, $5b_2$, $5b_3$, and $5b_4$ serve to bias the spherical distal end portion 1m of the third projecting portion 1r of the variable apical angle prism 1 against the spherical sliding portion $5b_5$ of the power transmission lever 5.

With this arrangement, the power transmission lever 5 has freedom of rotation in every directions about the distal end portion 1m of the third projecting portion 1r of the variable apical angle prism 1. Similarly, the power transmission lever 5 has freedom of rotation in every directions about the spherical distal end portion 4e of the lead nut portion 4d of the first stepping motor 4.

In this manner, since the lead nut portion 4d of the first stepping motor 4 and the second holding lens barrel 1k of the variable apical angle prism 1 are coupled to each other without causing any power loss and cluttering, the pitch angle of the variable apical angle prism 1 accurately changes in accordance with the rotation of the first stepping motor 4.

The second stepping motor 6 is constituted by a motor portion 6a as a known PM type stepping motor, a lead screw 6b arranged integrally with the rotational shaft of a rotor of the motor portion 6a, a mounting angle 6f having a bearing for axially supporting the lead screw 6b, a guide bar 6c fixed to the mounting angle 6f, and a lead nut portion 6d having a sleeve fitted with the guide bar 6c, and a screw portion fitted with the lead screw 6b. The lead nut portion 6d moves in the optical axis direction according to rotation of the rotor of the motor portion 6a.

The second power transmission lever 7 is formed by molding, e.g., a polyacetal resin, and has a first bearing portion 7a and a second bearing portion 7b.

The first bearing portion 7a axially supports a spherical distal end portion 6e formed on the lead nut portion 6d of the second stepping motor 6 without cluttering, and the second bearing portion 7b axially supports the spherical distal end portion 1i of the first projecting portion 1h formed on the first holding lens barrel 1e of the variable apical angle prism 1 without cluttering.

With the above-mentioned arrangement, the power transmission lever 7 has freedom of rotation in every directions about the distal end portion 1i of the first projecting portion 1h of the variable apical angle prism 1. Similarly, the power transmission lever 7 has freedom of rotation in every directions about the spherical distal end portion 6e of the lead nut portion 6d of the second stepping motor 6.

In this manner, since the lead nut portion 6d of the second stepping motor 6 and the first holding lens barrel 1e of the variable apical angle prism 1 are coupled to each other without causing any power loss and cluttering, the yaw angle of the variable apical angle prism 1 accurately changes in accordance with the rotation of the second stepping motor 6.

The circuit arrangement of the anti-vibration device according to the first embodiment of the present invention will be described below with reference to FIG. 2.

Referring to FIG. 2, first and second vibration gyros 10 and 11 serve as vibration sensors. The first vibration gyro 10 is fixed to the lens barrel 3a or a video camera main body (not shown) so as to output a voltage according to a lens swing speed only when the lens swings in the pitch direction shown in FIG. 1. The second vibration gyro 11 is similarly fixed to the lens barrel 3a or the video camera main body (not shown) so as to output a voltage according to a lens swing speed only when the lens swings in the yaw direction shown in FIG. 1.

A control circuit (e.g., a microcomputer) 12 receives angular velocity signals from the vibration gyros 10 and 11 via buffer amplifiers 15 and 16. The control circuit 12 has first to fourth input terminals 12a, 12b, 12c, and 12d, and first to fourth output terminals 12e, 12f, 12g, and 12h.

The first input terminal 12a is connected to the output terminal of the buffer amplifier 15 for amplifying the output from the first vibration gyro 10, and the second input terminal 12b is connected to the output terminal of the second photointerrupter 9. The third input terminal 12c is connected to the output terminal of the buffer amplifier 16 for amplifying the output from the second vibration gyro 11, and the fourth input terminal 12d is connected to the output terminal of the first photointerrupter 8.

The first output terminal 12e of the control circuit 12 is connected to a first input terminal 13a of a first driving circuit 13, and the second output terminal 12f is connected to a second input terminal 13b of the first driving circuit 13. The third output terminal 12g of the control circuit 12 is connected to a first input terminal 14a of a second driving circuit 14, and the fourth output terminal 12h is connected to a second input terminal 14b of the second driving circuit 14.

First to fourth output terminals 13c, 13d, 13e, and 13f (13d to 13f are not shown in FIG. 2) of the first driving circuit 13 are connected to the first stepping motor 4. Also, first to fourth output terminals 14c, 14d, 14e, and 14f (14d to 14f are not shown in FIG. 2) of the second driving circuit 14 are connected to the second stepping motor 6 (not shown in FIG. 1). These first and second driving circuits 13 and 14 are known driving circuits. That is, each driving circuit determines the rotational direction of the stepping motor depending on whether the output at the first input terminal 13a or 14a is at high or low level, and rotates the stepping motor every time a pulse is input to the second input terminal 13b or 14b.

The operation of a portion, related to the present invention, of the anti-vibration device with the above arrangement will be described below with reference to the flow charts of FIGS. 4A, 4B and 5. Note that FIGS. 4A and 4B are flow charts showing an anti-vibration operation (to be referred to as a main loop hereinafter) of the anti-vibration device of this embodiment, and FIG. 5 is a flow chart of a program of interrupt processing, which interrupts the main loop shown in FIGS. 4A and 4B to drive the motors on the basis of information in the main loop.

Figures 4, 4A:
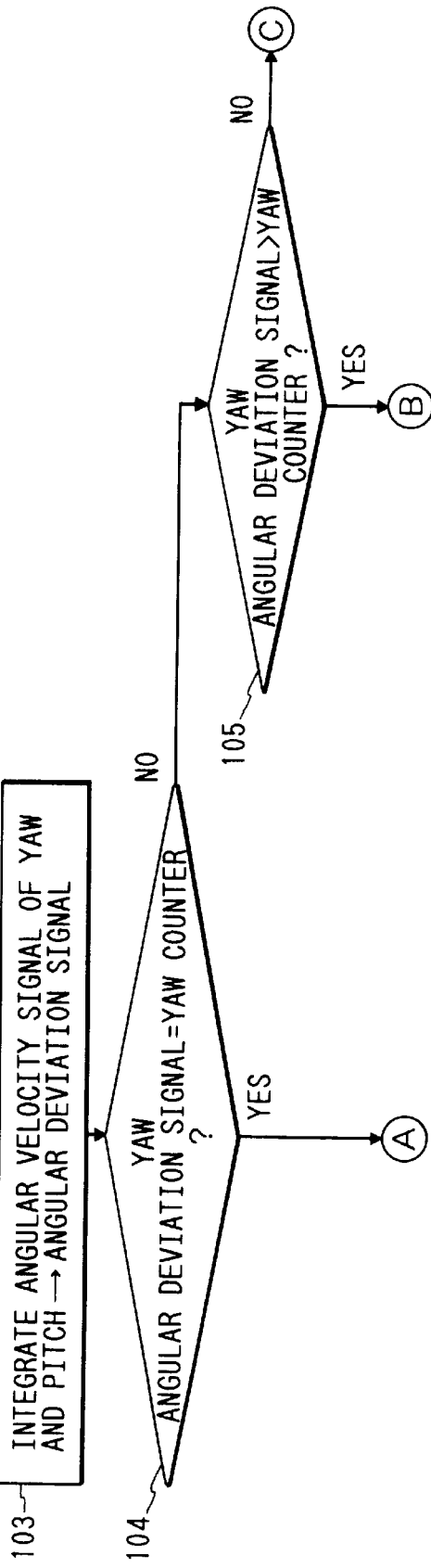
FIG. 4, which consists of FIGS. 4A and 4B, is a flow chart showing an operation of a portion, related to the present invention, of the anti-vibration device shown in FIG. 1.
Figure 4B:
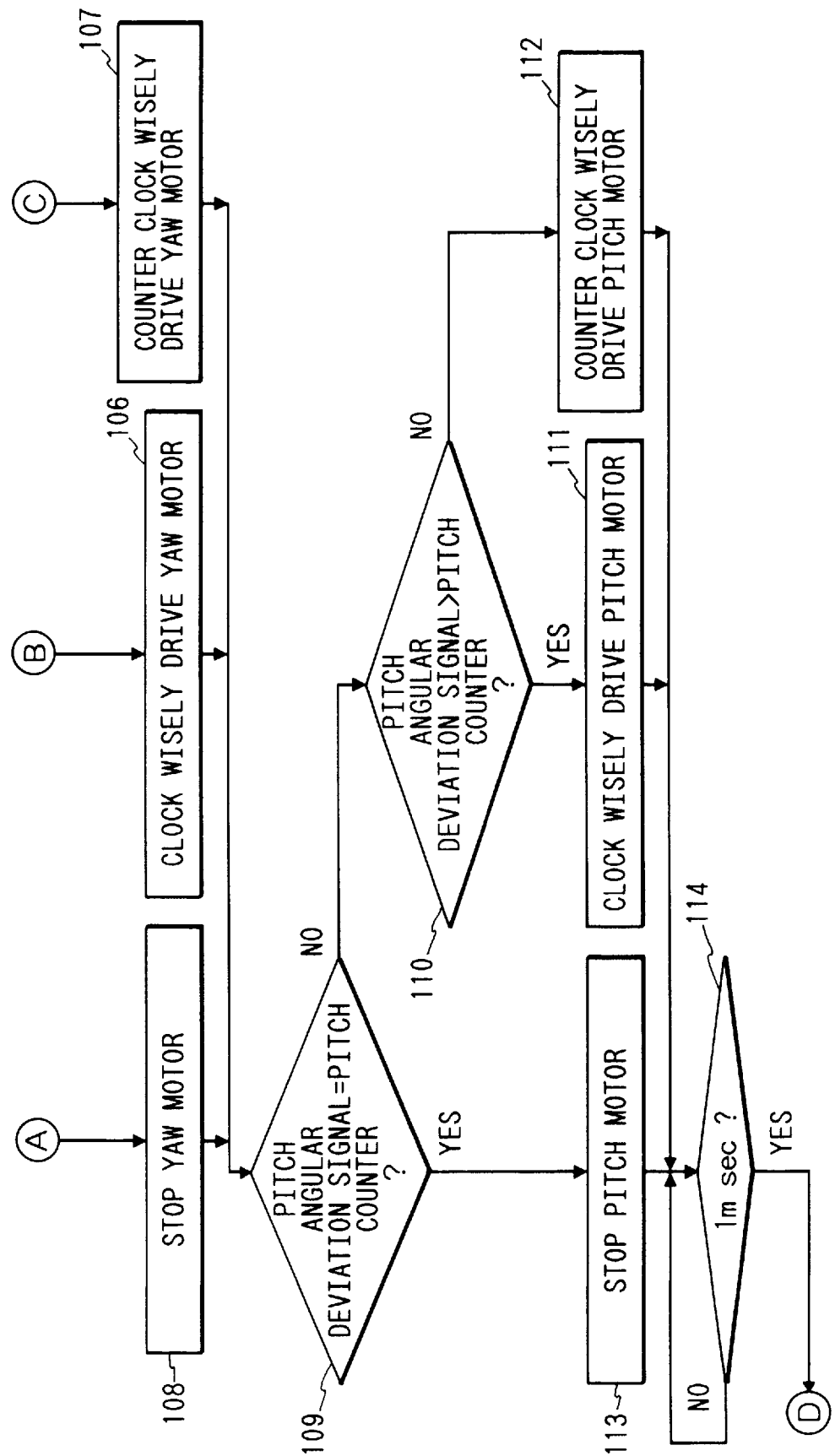
Figure 5:
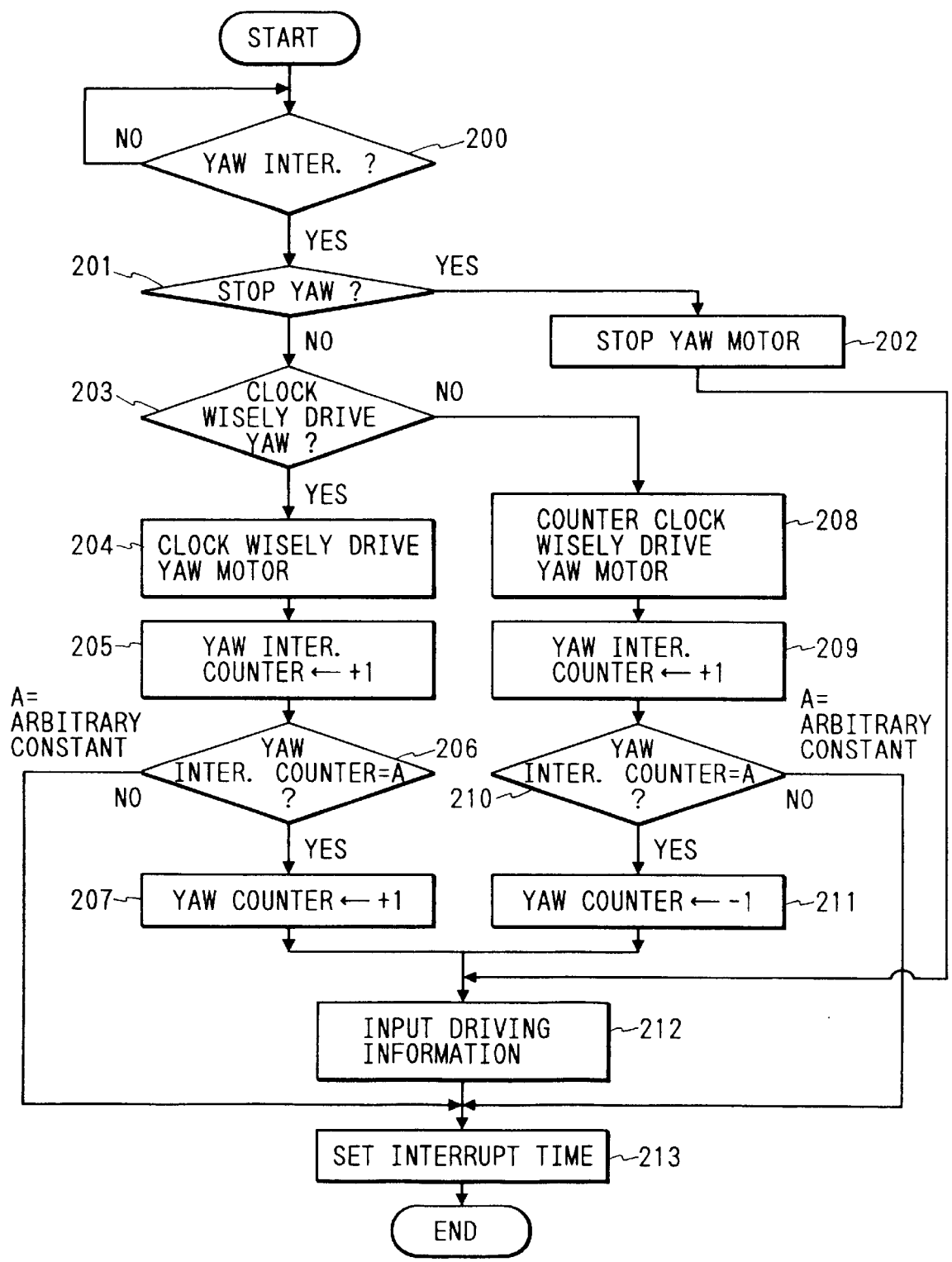
FIG. 5 is a flow chart showing an operation of the portion, related to the present invention, of the anti-vibration device shown in FIG. 1.

When the control circuit 12 (FIG. 2) is powered, control of the pitch and yaw stepping motors 4 and 6 is started from step 100 in FIGS. 4A and 4B.

[Step 100] The pitch and yaw stepping motors 4 and 6 are moved to the initial positions (reset positions) via the first and second driving circuits 13 and 14. This reset operation is performed to control the variable apical angle prism with a predetermined range from the reset position so as not to prevent the variable apical angle prism from colliding against other members. When the anti-vibration function is disabled, the variable apical angle prism is moved to the reset position, and is caused to stand still at the reset position.

[Step 101] Pitch and yaw counters are reset.

[Step 102] Angular deviation signals in the pitch yaw and pitch directions are fetched from the vibration gyros 10 and 11 via the buffer amplifiers 15 and 16, and are A/D-converted by internal A/D converters.

[Step 103] The angular velocity signals in the yaw and pitch directions, which are A/D-converted in step 102, are integrated to be converted into angular deviation signals.

Note that the angular deviation signals are position information of the stepping motors 4 and 6. When the stepping motors 4 and 6 are driven in accordance with these angular deviation signals, the yaw and pitch angles of the variable apical angle prism 1 are set, as described above, and an anti-vibration operation is enabled, as will be described later.

[Step 104] The angular deviation signal in the yaw direction is compared with the value of the yaw counter. If the two values are equal to each other, the flow advances to step 108; otherwise, the flow advances to step 105.

[Step 105] It is checked if the angular deviation signal in, the yaw direction is larger than the value of the yaw counter. If YES in step 105, the flow advances to step 106; otherwise, the flow advances to step 107.

[Step 106] Since the angular deviation signal in the yaw direction is larger than the value of the yaw counter, the stepping motor 6 for yaw-direction driving is driven clockwise. The flow then advances to step 109.

[Step 107] Since the angular deviation signal in the yaw direction is equal to or smaller than the value of the yaw counter, the stepping motor 6 for yaw-direction driving is driven counterclockwise. The flow then advances to step 109.

[Step 108] Since the angular deviation signal in the yaw direction is equal to the value of the yaw counter, it is determined that the stepping motor 6 for yaw-direction driving is located at a required position, and the stepping motor 6 is stopped. The flow then advances to step 109.

[Step 109] The angular deviation signal in the pitch direction is compared with the value of the pitch counter. If the two values are equal to each other, the flow advances to step 113; otherwise, the flow advances to step 110.

[Step 110] It is checked if the angular deviation signal in the pitch direction is larger than the value of the pitch counter. If YES in step 110, the flow advances to step 111; otherwise, the flow advances to step 112.

[Step 111] Since the angular deviation signal in the pitch direction is larger than the value of the pitch counter, the stepping motor 4 for pitch-direction driving is driven clockwise. The flow then advances to step 114.

[Step 112] Since the angular deviation signal in the pitch direction is equal to or smaller than the value of the pitch counter, the stepping motor 4 for pitch-direction driving is driven counterclockwise. The flow then advances to step 114.

[Step 113] Since the angular deviation signal in the pitch direction is equal to the value of the pitch counter, it is determined that the stepping motor 4 for pitch-direction driving is located at a required position, and the stepping motor 4 is stopped. The flow then advances to step 114.

[Step 114] It is checked if a sampling time of 1 msec has elapsed. If NO in step 114, the flow stays in this step; otherwise, the flow returns to step 102 to repeat the same operation.

Interrupt processing for generating signals for actually driving the stepping motors 4 and 6 for respectively performing driving operations in the pitch and yaw directions will be described below with reference to FIG. 5.

The interrupt processing shown in FIG. 5 generates clock pulses for driving the motors on the basis of information in the main loop shown in FIGS. 4A and 4B, as described above, and up/down-counts the yaw and pitch counters. The interrupt processing is started at an arbitrary timing in the main loop shown in FIGS. 4A and 4B at a predetermined interval. Note that FIG. 5 is a flow chart showing only the anti-vibration operation in the yaw direction. However, since the anti-vibration operation in the pitch direction is performed in the same manner as in FIG. 5, a detailed description thereof will be omitted here.

[Step 200] It is checked if an interrupt for yaw-direction driving is generated. If YES in step 200, the flow advances to step 201.

[Step 201] It is checked if driving information formed in the main loop in the yaw direction is information for stopping the stepping motor 6. If YES in step 201, the flow advances to step 202; otherwise, the flow advances to step 203.

[Step 202] Since the driving information formed in the main loop in the yaw direction is information for stopping the stepping motor 6, the stepping motor 6 is stopped. This operation is realized by stopping a driving pulse supplied from the output terminal 12f of the control circuit 12 (FIG. 2) to the input terminal 13b of the driving circuit 13. The flow then advances to step 212.

[Step 203) Since the driving information formed in the main loop in the yaw direction is information for driving the stepping motor 6, it is checked if the driving direction is the clockwise direction. If YES in step 203, the flow advances to step 204; otherwise, the flow advances to step 208.

[Step 204] The stepping motor 6 is rotated clockwise. This operation is realized by setting a driving direction signal to be output from the output terminal 12e of the control circuit 12 to the input terminal 13a of the driving circuit 13 at low level, and outputting a drive pulse from the output terminal 12f of the control circuit 12 to the input terminal 13b of the driving circuit 13.

[Step 205] The content of a yaw interrupt counter is incremented by "1".

[Step 206] It is checked if the value of the yaw interrupt counter has reached an arbitrary constant A. If the value of the counter≠A, the flow advances to step 213; if the value of the yaw interrupt counter has reached the arbitrary constant A, i.e., if the value of the counter=A, the flow advances to step 207.

[Step 207] The value of the yaw counter is incremented by "1".

If it is determined in step 203 that the stepping motor 6 is to be driven counterclockwise, the flow advances to step 208, as described above.

[Step 208] The stepping motor 6 is rotated counterclockwise. This operation is realized by setting the driving direction signal to be output from the output terminal 12i eof the control circuit 12 to the input terminal 13a of the driving circuit 13 at high level, and outputting a driving pulse from the output terminal 12f of the control circuit 12 to the input terminal 13b of the driving circuit 13.

[Step 209] The content of a yaw interrupt counter is incremented by "1".

[Step 210] It is checked if the value of the yaw interrupt counter has reached an arbitrary constant A. If the value of the counter≠A, the flow advances to step 213; if the value of the yaw interrupt counter has reached the arbitrary constant A, i.e., if the value of the counter=A, the flow advances to step 211.

[Step 211] Since the yaw driving direction is the counterclockwise direction, the value of the yaw counter is decremented by "1".

[Step 212] Driving information (motor driving direction, and motor stop information) formed in the main loop is fetched in the interrupt program.

[Step 213] A time until the next interrupt for generating a clock for driving the yaw motor is set.

The above-mentioned operations are performed at every interrupt. As described above, the driving operation in the pitch direction is performed by the same interrupt processing having a different timing from that in the yaw direction.

The anti-vibration operation is performed by executing the series of operations shown in FIGS. 4A, 4B and 5. The operation of the anti-vibration device will be summarized below with reference to FIGS. 6A and 6B.

Figure 6A:
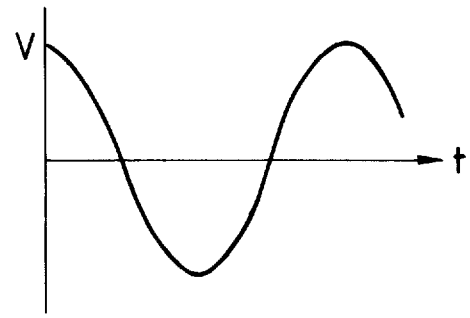
FIGS. 6A and 6B show signal waveforms for schematically explaining the operation of the anti-vibration device shown in FIG. 1.
Figure 6B:
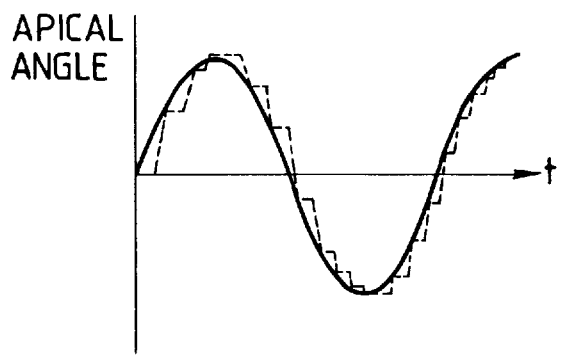

Time is plotted along the abscissa of each of FIGS. 6A and 6B, the voltage is plotted along the ordinate of FIG. 6A, and the apical angle (deviation angle from the movable center) of the variable apical angle prism 1 is plotted along the ordinate of FIG. 6B.

When a vibration acts on the video camera due to, e.g., a camera shake, the first or second vibration gyro 10 or 11 outputs a voltage (angular velocity signal), as shown in FIG. 6A. Upon reception of this signal, the control circuit 12 performs integral processing therein, and outputs a deviation signal generated by the processing to the first or second driving circuit 13 or 14 to control the first or second stepping motor 4 or 6 so as to move the variable apical angle prism 1 to a position indicated by a solid curve in FIG. 6B with respect to the time. With this control, the apical angle of the variable apical angle prism 1 changes, as indicated by a broken curve in FIG. 6B, thus executing the anti-vibration operation.

In this embodiment, a count is used in driving control of the first or second stepping motor 4 or 6, and this control is made based on the reset value of the count (including a value when the variable apical angle prism is at the center of the movable range, and a value which changes from the former value during the anti-vibration operation), and the angular deviation signal, thus attaining apical angle control of the variable apical angle prism.

As described above, according to the first embodiment, the variable apical angle prism 1 is moved by the stepping motors 4 and 6 via the power transmission levers 5 and 7 on the basis of the outputs from the vibration sensors (vibration gyros 10 and 11) so as to execute the anti-vibration operation. For this reason, even when a force necessary for moving the variable apical angle prism 1 changes due to a change in photographing environment, an anti-vibration photographing operation can be realized without causing an oscillation of the control system.

Since the variable apical angle prism 1 is moved by converting the rotations of the stepping motors 4 and 6 arranged to be parallel to the optical axis into movements in the optical axis direction, when the anti-vibration function is disabled, the variable apical angle prism 1 can be held at a predetermined position (position of the movable center) without energizing the motors or arranging any special lock mechanism.

(Second Embodiment)

In the first embodiment, the stepping motor is used as a power source for moving the variable apical angle prism 1. Alternatively, a DC motor may be used as a power source. An anti-vibration device with this arrangement will be described hereinafter as the second embodiment of the present invention.

Figure 7:
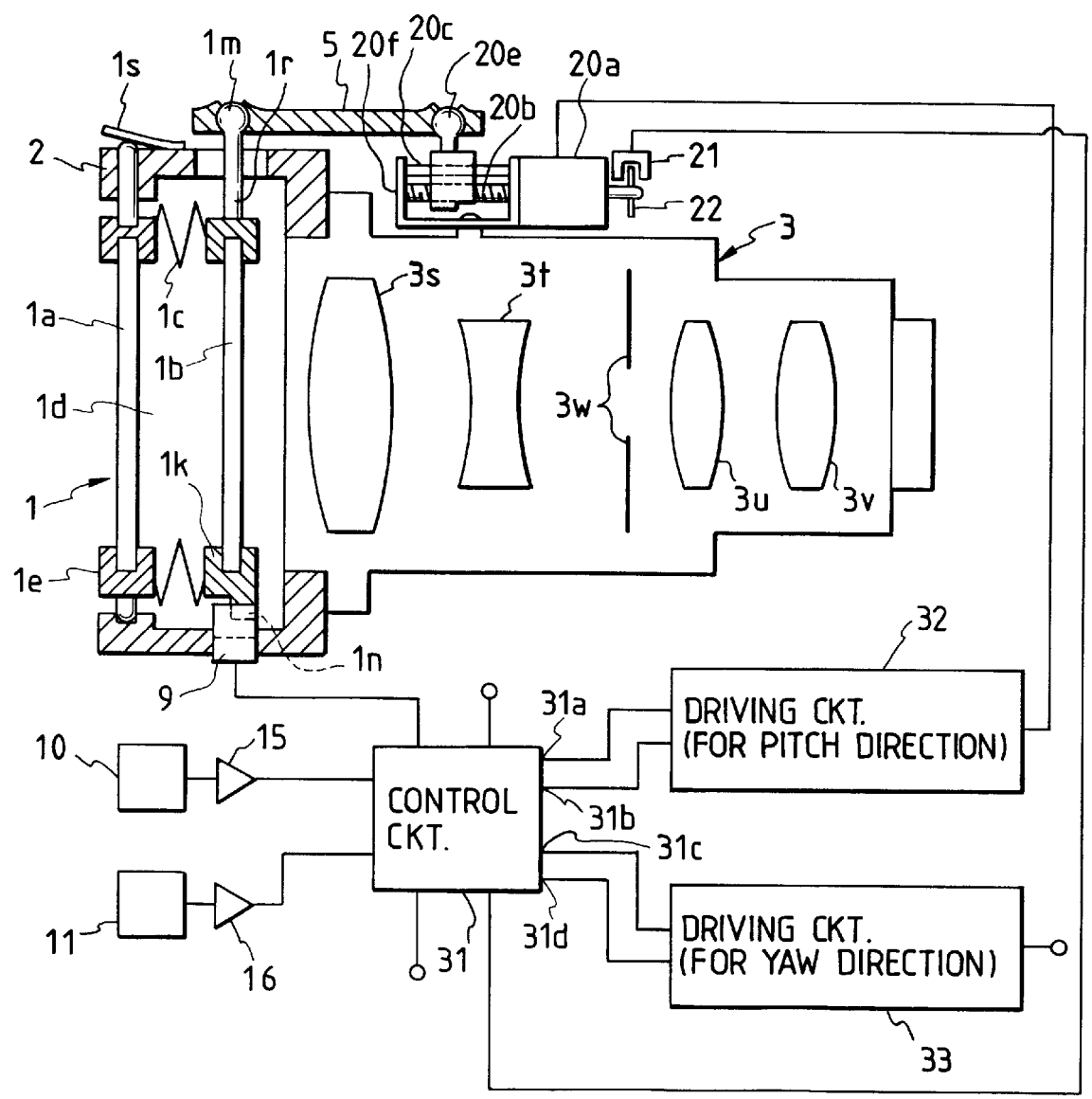
FIG. 7 is a sectional view of an anti-vibration device according to the second embodiment of the present invention, and a block diagram showing electrical blocks thereof.

FIG. 7 is a sectional view of an anti-vibration device according to the second embodiment of the present invention, and a block diagram showing electrical blocks thereof. In this embodiment, the variable apical angle prism is moved by rotation of a DC motor, and the rotation of the DC motor is detected by a pulse plate fixed to a rotor of the DC motor, and a photointerrupter. Note that the same reference numerals in FIG. 7 denote the same parts as in FIG. 1, and a detailed description thereof will be omitted.

Referring to FIG. 7, a first DC motor 20 comprises a motor portion 20a, a lead screw 20b, a guide bar 20c, and a lead nut 20d. Also, a third photointerrupter 21 and a first pulse plate 22 are arranged near the first DC motor 20.

The lead screw 20b is integrated with the rotor of the motor portion 20a. As in the first embodiment described above, the lead nut 20d moves in the optical axis direction upon rotation of the DC motor 20, thereby changing the apical angle of the variable apical angle prism 1. The pulse plate 22 is fixed to the rotor of the motor portion 20a, and is inserted in a slit portion between a light-emitting portion and a light-receiving portion of the third photointerrupter 21. The third photointerrupter 21 outputs a pulse output according to the rotation of the DC motor 20 to a control circuit 31.

A first driving circuit 32 drives the first DC motor 21, and a second driving circuit 33 drives a second DC motor (not shown).

FIG. 7 illustrates only the pitch DC motor 20. However, the yaw DC motor has the same mechanism as described above.

In the above-mentioned arrangement, when the output from a first output terminal 31a of the control circuit 31 goes to high level, the first driving circuit 32 drives the DC motor 20; when the output from the first output terminal 31a goes to low level, the first driving circuit 32 brakes the DC motor 20. When the output from a second output terminal 31b of the control circuit 31 goes to high level, the first driving circuit 32 rotates the DC motor 20 clockwise; when the output from the second output terminal 31b of the control circuit 31 goes to low level, the first driving circuit 32 rotates the DC motor 20 counterclockwise. The control circuit in the first embodiment described above outputs a pulse train so as to rotate the motors, while the control circuit 31 in this embodiment sets the output to the driving circuit at high or low level so as to rotate or brake the DC motor and to rotate the DC motor clockwise or counterclockwise.

According to the second embodiment, since a DC motor is used as a power source, higher-speed response can be realized as compared to the first embodiment using a stepping motor as a power source.

When the motor is stopped, higher-speed response can be realized using means for, e.g., braking the motor at a position a predetermined amount before the required position.

(Third Embodiment)

In each of the first and second embodiments described above, the motor with the lead screw, the rotor shaft of which is arranged at a position parallel to the optical axis, is used as a power source, and movement, in the optical axis direction, of the lead nut is transmitted to the variable apical angle prism via the power transmission lever. Alternatively, the variable apical angle prism may be directly driven by rotation of the motor. An anti-vibration device with this arrangement will be described hereinafter as the third embodiment of the present invention.

Figure 8:
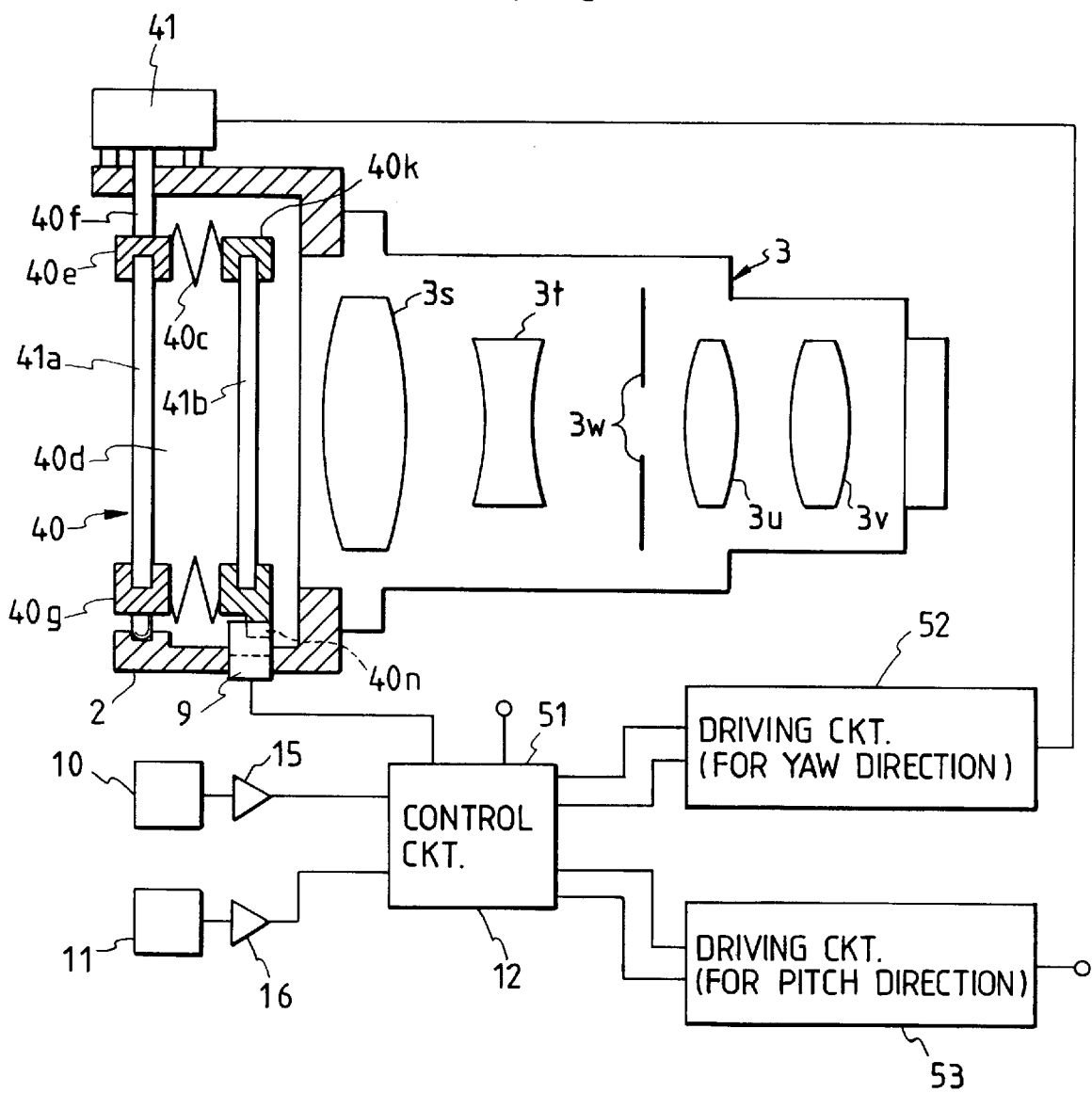
FIG. 8 is a sectional view of an anti-vibration device according to the third embodiment of the present invention, and a block diagram showing electrical blocks thereof.

FIG. 8 is a sectional view of an anti-vibration device according to the third embodiment of the present invention, and a block diagram showing electrical blocks thereof. In this embodiment, the variable apical angle prism is directly driven by a motor. Note that the same reference numerals in FIG. 8 denote the same parts as in FIG. 1, and a detailed description thereof will be omitted.

Referring to FIG. 8, a first stepping motor 41 is arranged, so that the rotational shaft of its rotor is rotated integrally with a first shaft 40f of a first holding lens barrel 40e of a variable apical angle prism 40.

The circuit arrangement shown in FIG. 8 includes a control circuit 51, a first driving circuit 52 for driving the first stepping motor 41 on the basis of a signal from the control circuit, and a second driving circuit 53 for driving a second stepping motor (not shown).

With the above arrangement, upon reception of an angular velocity signal from the vibration gyro 10 or 11, the control circuit 51 converts the received signal into a deviation signal by integrating the received signal, and drives the first or second driving circuit 52 or 53 to directly drive the first stepping motor 41 or the second stepping motor (not shown), thereby executing apical angle control of the variable apical angle prism 40 so as to suppress a vibration. When the anti-vibration function is disabled, the first or second stepping motor is stopped, and the variable apical angle prism 40 is locked by the detent torque of the motor.

In the third embodiment, since the apical angle of the variable apical angle prism 40 is directly changed by rotation of the stepping motor, a high response frequency can be obtained. In this embodiment, so-called micro-step driving is preferably performed to obtain a sufficiently fine optical axis correction amount per step.

As described above, according to the first to third embodiments, since the apical angle of the variable apical angle prism is controlled by open-loop control (not closed-loop control) on the basis of the output from the vibration gyro as the vibration sensor, a stable anti-vibration effect can always be obtained without causing any oscillation due to a change in load torque caused by a change in photographing environment.

When the anti-vibration function is disabled, since the variable apical angle prism can be locked by the detent torque or cogging torque of the stepping motor or the DC motor, power consumption can be reduced as compared to a conventional device, which electrically locks the variable apical angle prism, and a compact anti-vibration device can be realized since it does not require any special lock mechanism (mechanical lock means). Therefore, a photographing apparatus such as a video camera in which the device is assembled can be rendered compact.

More specifically, a compact photographing apparatus such as a video camera, which has an anti-vibration function, can be used for a long period of time with a single battery, and has good portability, can be realized.

As described above, according to the first to third embodiments of the present invention, an anti-vibration device comprises an actuator controlled by a pulse signal, and control means for calculating a driving amount of optical correction means on the basis of a signal from vibration detection means, and controlling a driving operation of the actuator on the basis of the calculation result and predetermined position information detected by reset position detection means. The optical correction means is deviated under the open-loop control by an amount corresponding to a vibration detected by the vibration detection means.

Therefore, followability of anti-vibration control with respect to a vibration can be improved without causing any oscillation.

A motor is used as the actuator for driving the optical correction means, and the stop state of the optical correction means at a predetermined position is held by utilizing the torque of the motor.

Therefore, neither electrical nor mechanical means for holding the optical correction means at the predetermined position are required, and a compact structure and energy saving of the device can be achieved.

(Fourth Embodiment)

In an anti-vibration device according to the fourth embodiment of the present invention, in addition to the device of the first embodiment, an offset between the movable center position of optical correction means, i.e., a variable apical angle prism, and the reset position for a driving actuator is stored in a memory, and when an anti-vibration operation is stopped, a power source voltage to, e.g., the actuator is stopped after a reset operation is performed.

The operation of the anti-vibration device according to the fourth embodiment of the present invention will be described below with reference to the flow chart shown in FIGS. 9A and 9B. Note that the arrangement of the anti-vibration device of the fourth embodiment is the same as that of the first embodiment shown in FIGS. 1 to 3.

Figure 9B:
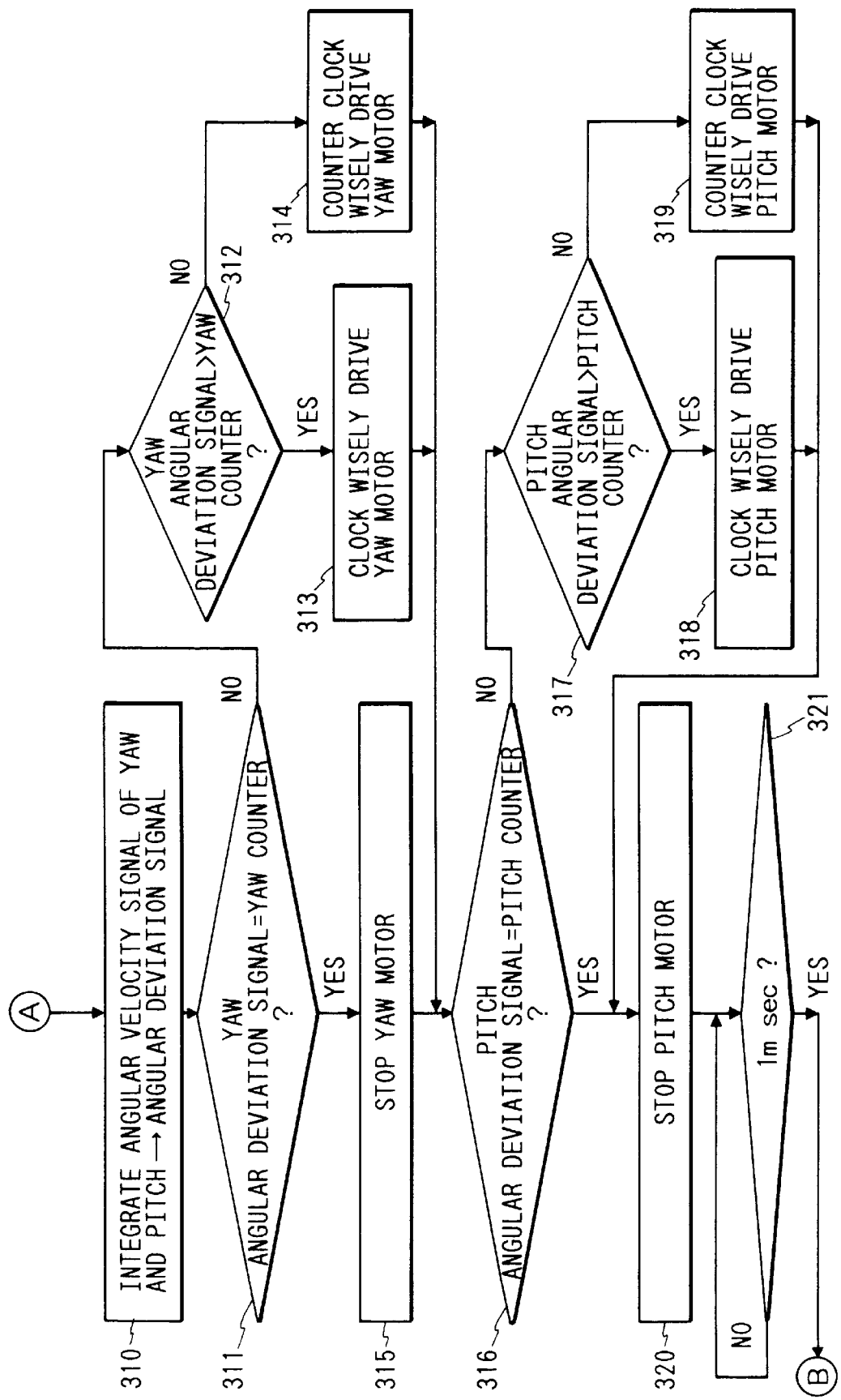
FIG. 9, which consists of FIGS. 9A and 9B is a flow chart showing an operation of an anti-vibration device according to the fourth embodiment of the present invention.

As for an operation, the flow shown in FIG. 5 interrupts the flow chart (main loop) of FIGS. 9A and 9B showing the anti-vibration operation, and interrupt processing for driving the motors on the basis of information in the main loop is executed.

Since steps 300, 301, and 310 to 321 in FIGS. 9A and 9B are the same as steps 100, 101, and 102 to 114 in FIGS. 4A and 4B showing the anti-vibration operation of the first embodiment, a detailed description thereof will be omitted, and only steps 302 to 308 different from those in FIGS. 4A and 4B will be described below. In these steps, supply of a power source voltage is stopped after the reset operation is performed when a power switch is turned off.

[Step 302] It is checked if a power source switch (not shown) is ON. If NO in step 302, the flow advances to step 303; otherwise, the flow advances to step 306.

[Step 303] The pitch and yaw stepping motors 4 and 6 are moved to the initial positions (reset positions) via the first and second driving circuits 13 and 14 as in step 100.

[Step 304] The driving operations of the pitch and yaw stepping motors 4 and 6 are stopped.

[Step 305] The power source is turned off, thus ending this operation.

If it is determined in step 302 that the power source switch (not shown) is ON, the flow advances to step 306, as described above.

[Step 306] It is checked if an anti-vibration switch (not shown) is ON. If YES in step 306, the flow advances to step 309; otherwise, the flow advances to step 307.

[Step 307] The pitch and yaw stepping motors 4 and 6 are driven via the first and second driving circuits 13 and 14 to move the variable apical angle prism 1 to the movable center.

[Step 308] The driving operations of the pitch and yaw stepping motors 4 and 6 are stopped, and the flow returns to step 306.

Then, the interrupt processing (FIG. 5) for generating signals for actually driving the stepping motors 4 and 6 for the driving operations in the pitch and yaw directions is executed at an arbitrary timing in the main loop shown in FIGS. 9A and 9B at a predetermined time interval.

As in the first embodiment, clock pulses for driving the motors are generated based on information in the main loop shown in FIGS. 9A and 9B, and yaw and pitch counters are up/down-counted.

Anti-vibration control is achieved by executing a series of operations shown in FIGS. 9A, 9B and 5.

Figure 10:
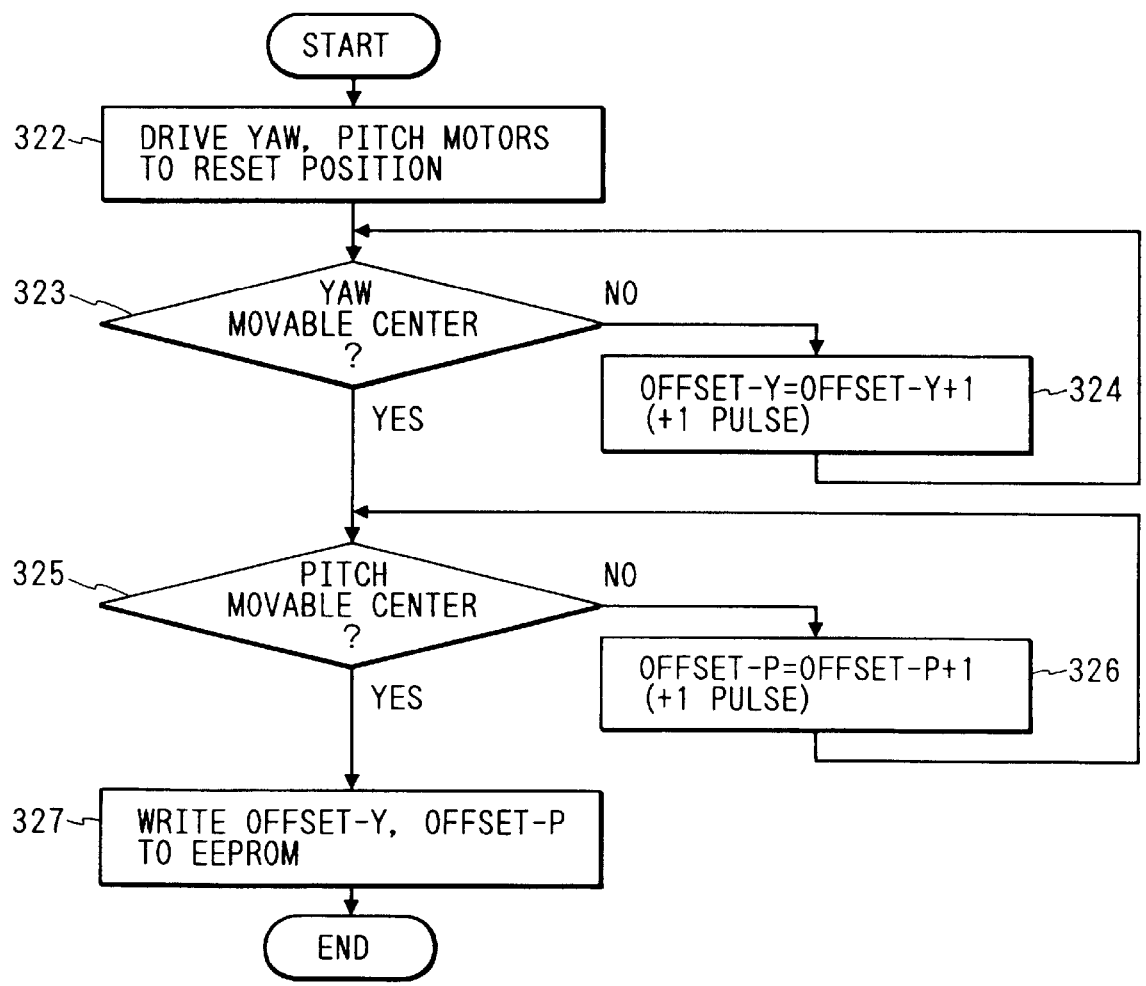
FIG. 10 is a flow chart also showing an operation of an anti-vibration device according to the fourth embodiment of the present invention.

A storage operation of the initial position (an offset amount from the movable center) of the variable apical angle prism 1 will be described below with reference to the flow chart in FIG. 10.

[Step 322] The pitch and yaw stepping motors 4 and 6 are moved to the initial positions (reset positions) via the first and second driving circuits 13, and 14.

[Step 323] It is checked if the variable apical angle prism 1 is located at the movable center in the yaw direction. If NO in step 323, the flow advances to step 324; otherwise, the flow advances to step 325.

[Step 324] A counter OFFSET-Y is incremented by "1".

[Step 325] It is checked if the variable apical angle prism 1 is located at the movable center in the pitch direction. If NO in step 325, the flow advances to step 326; otherwise, the flow advances to step 327.

[Step 326] A counter OFFSET-P is incremented by "1".

[Step 327] The values of the counters OFFSET-Y and OFFSET-P are written in an internal EEPROM of the control circuit 12.

The above-mentioned operation, i.e., an operation for storing offset amounts between the positions of reset sensors for resetting the positions of the stepping motors 4 and 6, and the movable center position where the variable apical angle prism 1 is to be located when the anti-vibration mode is OFF, is executed before the anti-vibration control is started. In the anti-vibration control, the variable apical angle prism 1 is controlled based on the stored point, thus improving anti-vibration performance.

According to the embodiment described above, since the movable center position of the variable apical angle prism is measured from the reset position, and is stored in the EEPROM, the absolute position of each stepping motor can be detected with reference to the reset position. Thus, the microcomputer can detect the current position of the variable apical angle prism from the movable center by executing only one reset operation before the anti-vibration control, thus improving anti-vibration performance.

When the anti-vibration function is OFF, the driving operations of the open-loop controllable stepping motors are stopped, and the variable apical angle prism is fixed at the movable center. A problem in a photographing operation, i.e., a problem that an object image in a direction shifted from the direction of the camera directed by a photographer is undesirably photographed, can be solved.

When the power source switch is turned off, the variable apical angle prism is driven to the reset position, and thereafter, the power source is turned off. For this reason, a time required for the reset operation when the power source switch is turned on car be shortened.

As described above, according to the fourth embodiment of the present invention, an anti-vibration device comprises an actuator for driving optical correction means, offset amount calculation means for calculating an offset amount between the movable center position of the optical correction means and a reset position, and storing the calculated offset amount in storage means, prior to anti-vibration control, and control means for calculating a driving amount of the optical correction means on the basis of a signal from vibration detection means, and controlling the driving operation of the actuator on the basis of the calculation result, and the offset amount stored in the storage means. In the anti-vibration control, the driving operation of the actuator is controlled on the basis of the driving amount calculated based on a signal from the vibration detection means, and the offset amount stored in the storage means.

Therefore, the absolute position of the optical correction means can always be detected, thereby improving anti-vibration performance.

Also, according to the present invention, the anti-vibration device comprises control means for, when the anti-vibration control is stopped, performing a reset operation of the optical correction means, and driving the actuator on the basis of the offset amount stored in the storage means, so that when the anti-vibration control is stopped, the optical correction means is fixed at the movable center position.

Therefore, when the anti-vibration control is stopped, an image in a non-intended direction can be prevented from being photographed.

Furthermore, according to the present invention, the anti-vibration device comprises control means for, when a power source switch is turned off, performing a reset operation of the optical correction means, and stopping power supply, so that when the power source switch is turned on, the optical correction means is always located at the reset position.

Therefore, a time required from when the power source switch is turned on until the anti-vibration control is enabled can be shortened.

(Fifth Embodiment)

In addition to the first embodiment, the fifth embodiment of the present invention comprises control means for calculating a driving amount of a variable apical angle prism as optical correction means on the basis of a signal from an angular velocity sensor as vibration detection means, calculating a driving velocity of an actuator for driving the variable apical angle prism as the optical correction means on the basis of the signal from the angular velocity sensor as the vibration detection means, and controlling the actuator on the basis of these calculation results. With this arrangement, the driving velocity of the actuator is changed according to the magnitude of a signal from the vibration detection means to attain multi-velocity control of the actuator, i.e., to drive the actuator in an analog manner without repeating the driving and stopping operations.

The operation of the anti-vibration device according to the fifth embodiment of the present invention will be described below with reference to the flow charts in FIGS. 11A, 11B and 12. Note that FIGS. 11A and 11B are flow charts showing an anti-vibration operation (to be referred to as a main loop hereinafter) of the anti-vibration device of this embodiment, and FIG. 12 is a flow chart of a program of interrupt processing, which interrupts the main loop shown in FIGS. 11A and 11B to drive the motors on the basis of information in the main loop.

The operation of the anti-vibration device according to the fifth embodiment of the present invention will be described below with reference to the flow chart shown in FIGS. 11A and 11B. Note that the arrangement of the anti-vibration device of the fifth embodiment is the same as that of the first embodiment shown in FIGS. 1 to 3.

Figure 11B:
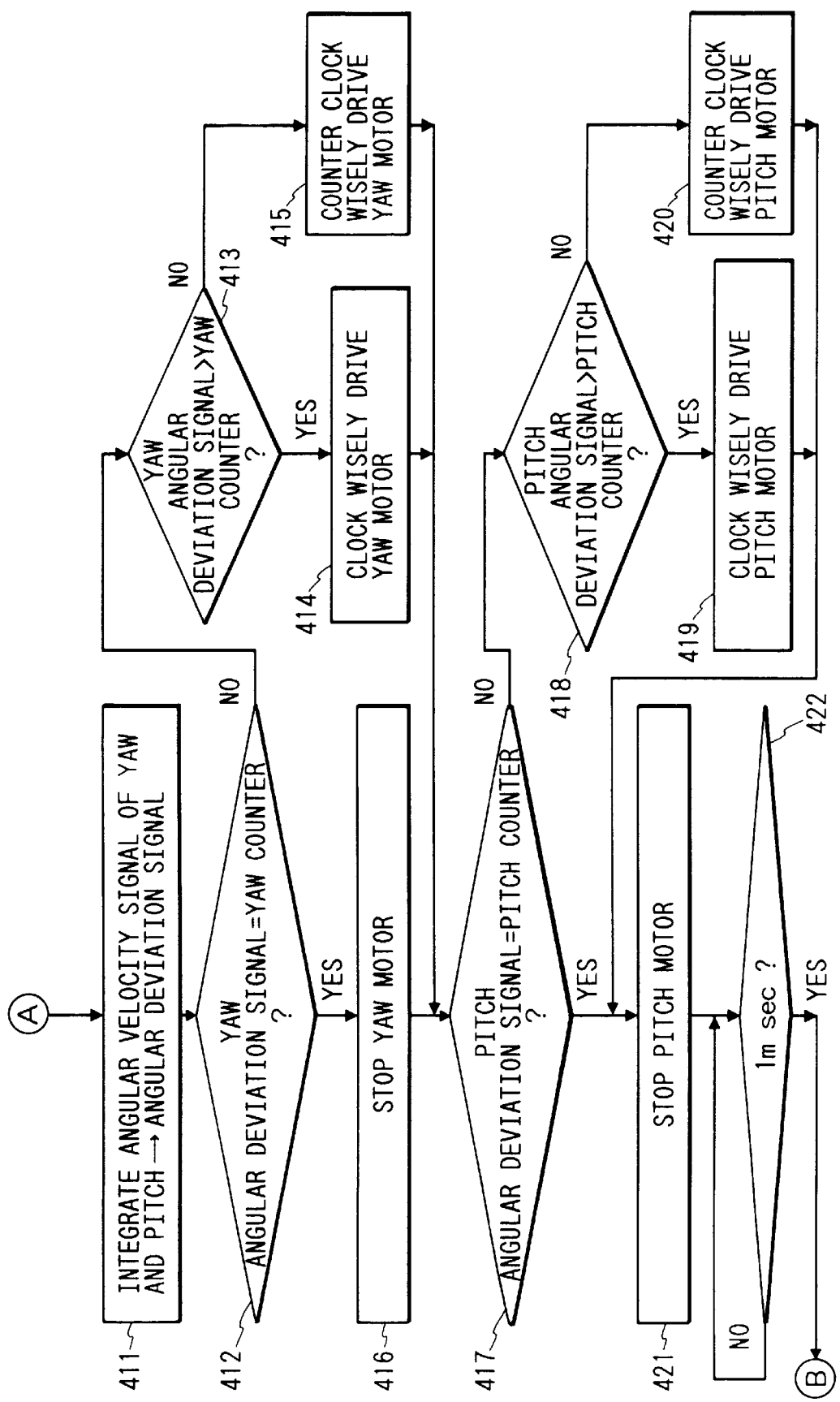
FIG. 11, which consists of FIGS. 11A and 11B, is a flow chart showing an operation of an anti-vibration device according to the fifth embodiment of the present invention.
Figure 12:
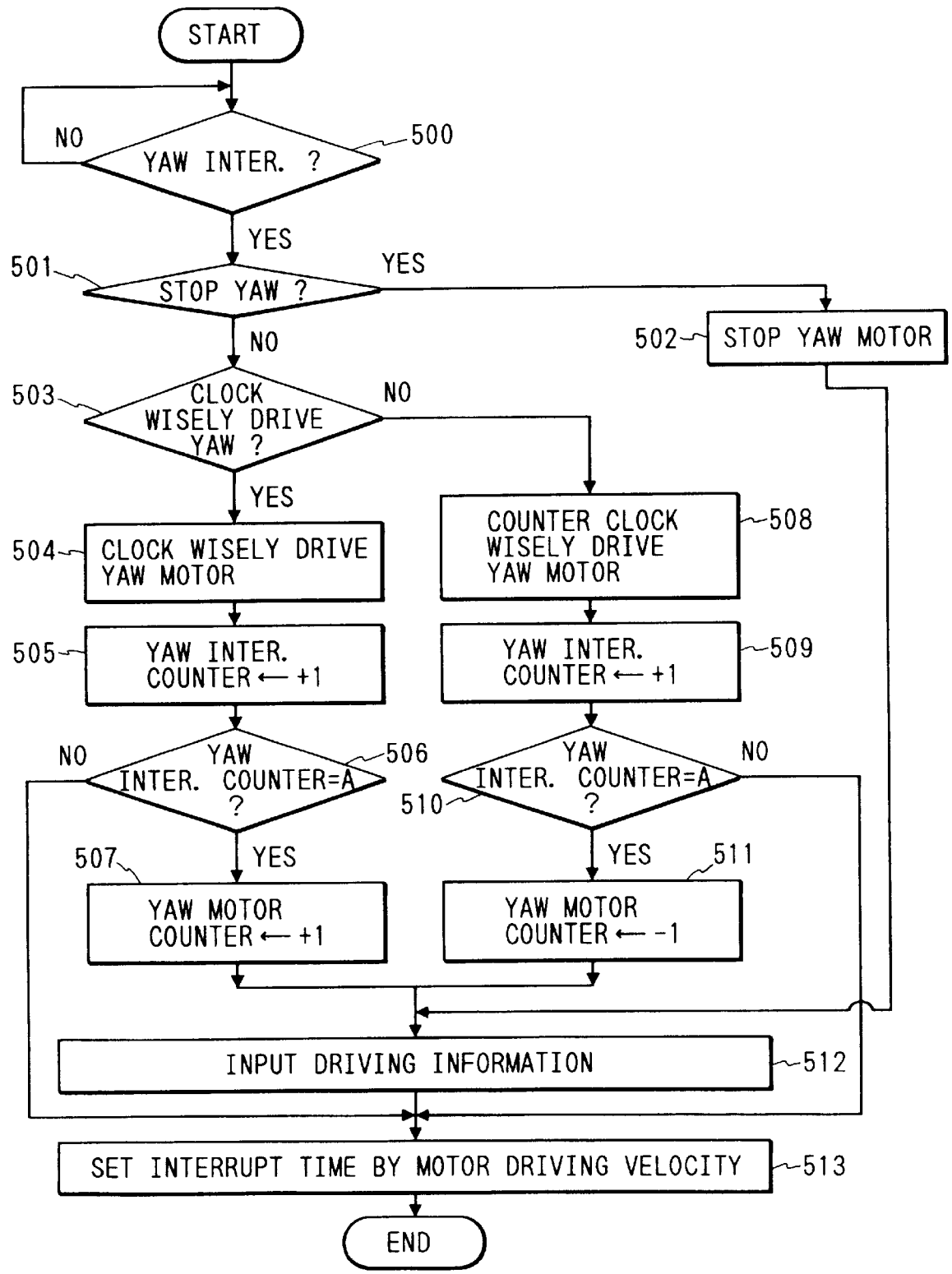
FIG. 12 is a flow chart also showing an operation of an anti-vibration device according to the fifth embodiment of the present invention.

As for an operation, the flow shown in FIG. 12 interrupts the flow chart (main loop) of FIGS. 11A and 11B showing the anti-vibration operation, and interrupt processing for driving the motors on the basis of information in the main loop is executed as in the first embodiment.

Steps 400 to 409, and 411 to 422 in FIGS. 11A and 11B are the same as steps 300 to 309, and 310 to 321 in FIGS. 9A and 9B showing the anti-vibration operation of the fourth embodiment. That is, step 410 is inserted between steps 309 and 310 in the flow chart in FIGS. 9 and 9B. Thus, a detailed description of the same step; as those in FIGS. 9A and 9B will be omitted, and only step 410 different from FIGS. 9A and 9B will be described below. In step 410, a motor driving velocity is calculated based on an output from an angular velocity sensor.

[Step 410] Angular velocity signals in the yaw and pitch directions, which are A/D-converted in step 409 are integrated to be converted into driving velocities of the pitch and yaw stepping motors 4 and 6.

The velocities of the stepping motors 4 and 6 have a one-to-one proportional relationship with the frequency of the driving pulses, output from the control circuit 12 to the driving circuits 13 and 14, for driving the motors, and the angular velocity signals in the yaw and pitch directions have a one-to-one proportional relationship with the velocities of the stepping motors 4 and 6. Therefore, the control circuit 12 outputs driving pulses having frequencies proportional to the angular velocity signals to the driving circuits 13 and 14, so that the stepping motors 4 and 6 can be driven at variable velocities. When the driving velocities of the stepping motors 4 and 6, which are converted from the angular velocity signals, exceed the possible driving velocities of the motors, they are replaced with the maximum velocities at which the stepping motors 4 and 6 can be driven.

The interrupt processing for generating signals for actually driving the stepping motors 4 and 6 for performing the driving operations in the pitch and yaw directions will be described below with reference to FIG. 12.

The interrupt processing shown in FIG. 12 generates clock pulses for driving the motors on the basis of information in the main loop shown in FIGS. 11A and 11B, and up/down-counts the yaw and pitch counters as in the first embodiment. The interrupt processing is started at an arbitrary timing in the main loop shown in FIGS. 11A and 11B at a predetermined interval. Note that FIG. 12 is a flow chart showing only the anti-vibration operation in the yaw direction. However, since the anti-vibration operation in the pitch direction is performed in the same manner as in FIG. 12, a detailed description thereof will be omitted here.

Note that steps 500 to 511 in FIG. 12 are the same as steps 200 to 211 in FIG. 5 of the first embodiment, and steps 212 and 213 in FIG. 5 are replaced with steps 512 and 513 in FIG. 12. Thus, a detailed description of the same steps as in FIG. 5 will be omitted, and only steps 512 and 513 different from those in FIG. 5 will be described below.

[Step 512] Driving information (motor driving direction, motor stop information, and driving velocity of the motor obtained in step 410 in FIGS. 11A and 11B formed in the main loop is fetched in the interrupt program.

[Step 513] A time until the next interrupt for generating a clock for driving the yaw motor is set on the basis of the driving information including the driving velocity of the motor input in step 512.

Anti-vibration control is achieved by controlling the driving velocities and the driving directions of the stepping motors 4 and 6 upon execution of the series of operations shown in FIGS. 11A, 11B and 12.

Figure 13A:
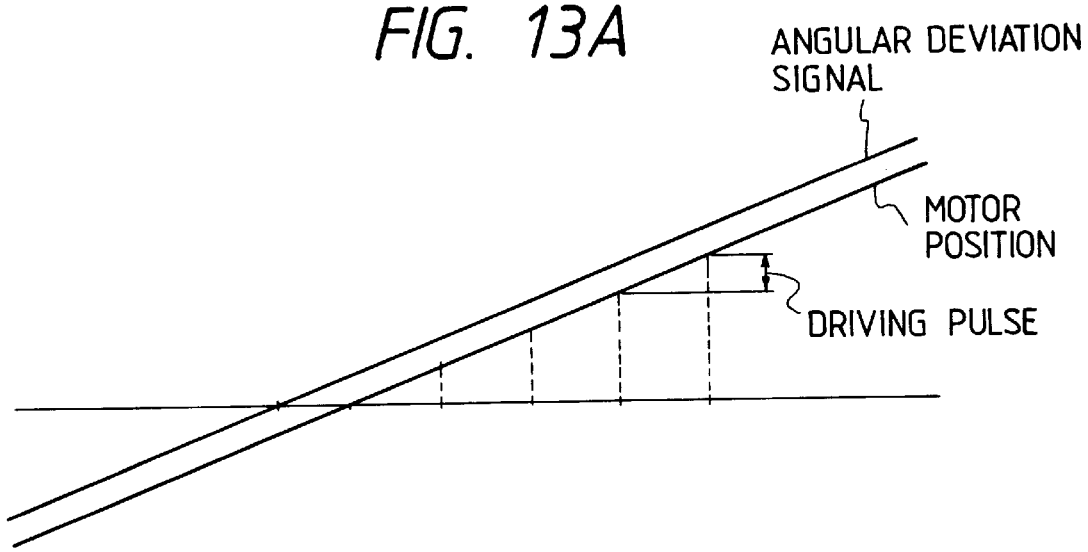
FIGS. 13A and 13B show the relationship between the motor position and the angular deviation signal of the anti-vibration device according to the fifth, embodiment of the present invention.
Figure 13B:
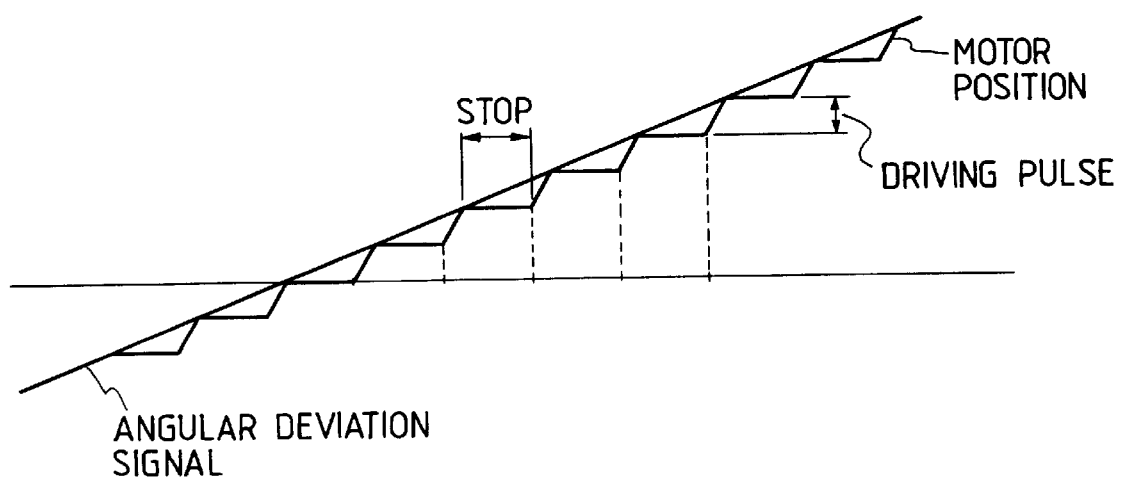

As a result, unlike conventional anti-vibration control attained by repeating the driving and stopping operations, as shown in FIG. 13A, anti-vibration control which causes the positions of the stepping motors 4 and 6 to follow the angular deviation signals without repeating the driving and stopping operations, as shown in FIG. 13B, can be realized.

According to this embodiment, the driving velocities of the stepping motors 4 and 6 are calculated based on the angular velocity signals, and the motors are driven on the basis of these driving velocity signals. Therefore, since the motors can follow the angular deviation signals without repeating the driving and stopping operations unlike in the conventional control, digital angular movement of the variable apical angle prism 1 in the anti-vibration control can be changed to smooth movement, and a problem of image deterioration on a screen can be solved. Also, noise upon repetition of driving and stopping operations can be reduced.

(Sixth Embodiment)

The sixth embodiment of the present invention comprises control means for setting a minimum control amount of a variable apical angle prism as optical correction means via an actuator to be equal to or smaller than a pixel pitch of an image pickup device upon conversion of the minimum control amount into a change in imaging position on the image pickup device. Thus, the minimum control amount used in control of the variable apical angle prism as optical correction means on the basis of an output signal from an angular velocity sensor as vibration detection means is set to be equal to or smaller than the pixel pitch of the image pickup device upon conversion of the minimum control amount to a change in imaging position on the image pickup device.

Since the arrangement of the anti-vibration device of this embodiment is the same as that of the first embodiment shown in FIGS. 1 to 3, and its operation is also the same as that of the first embodiment shown in FIGS. 4a, 4B and 5, a detailed description of the arrangement and the flow charts showing the operation will be omitted.

A unit correction amount of the anti-vibration device with the above arrangement will be described below with reference to FIG. 14.

Figure 14:
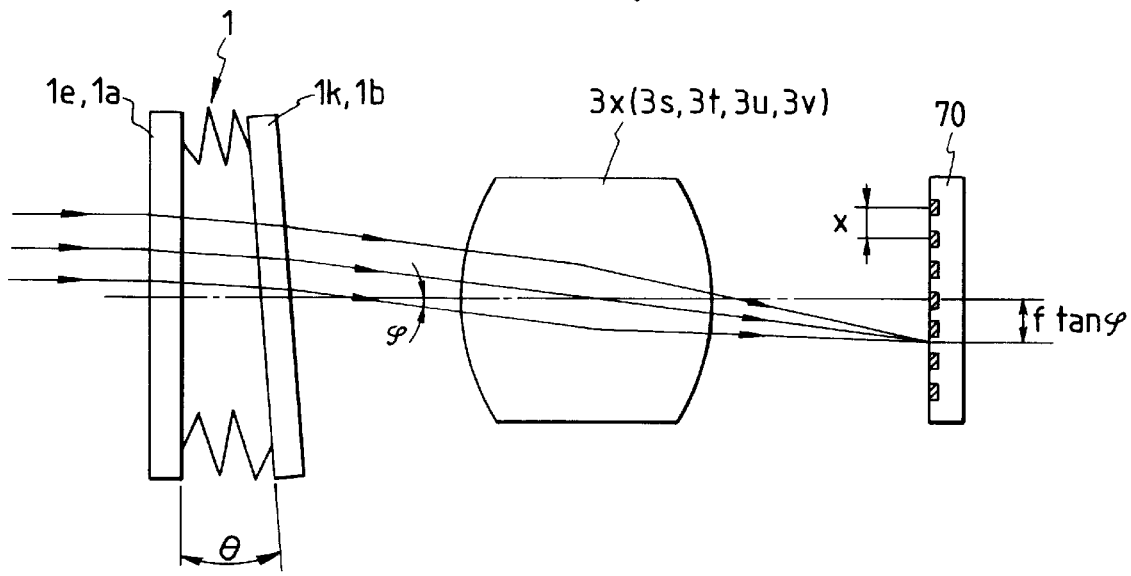
FIG. 14 is a view for explaining the relationship between a change in apical angle of a variable apical angle prism and a change in image position on a CCD in an anti-vibration device according to the sixth embodiment of the present invention.

FIG. 14 shows a state wherein the apical angle, i the pitch direction, of the variable angle prism 1 changes from 0° to θ° since the first stepping motor 4 is rotated by a predetermined amount in FIG. 1.

Referring to FIG. 14, 3x collectively represents the photographing optical systems 3s, 3t, 3u, and 3v of the photographing lens 3, and x indicates the pixel pitch of a CCD 70.

When the apical angle, in the pitch direction, of the variable apical angle prism 1 becomes θ°, the optical axis is bent by φ. θ and φ satisfy:

$$\phi = \alpha\theta$$

where α is a constant determined by the refractive index of the liquid filled in the variable apical angle prism 1.

If the focal length of the photographing optical system 3x is represented by f, when the apical angle, in the pitch direction, of the variable apical angle prism 1 becomes θ°, the optical axis is shifted by φ°, and an object image at an infinity on the CCD 70 forms an image at a position shifted by "ftanφ".

In the anti-vibration device according to this embodiment, the pitches of the lead screws 4b and 6b of the first and second stepping motors 4 and 6 are set, so that the shift amount of an image when each stepping motor is rotated by one step becomes equal to or smaller than a unit pixel pitch x of the CCD 70.

Furthermore, when the anti-vibration device of this embodiment is used in combination with a zoom lens, an optimal anti-vibration effect can be obtained at respective focal lengths if the minimum control pitch changes according to the focal length.

According to this embodiment, since the minimum control amount (minimum optical axis change angle) of the variable apical angle prism 1 upon execution of image-blur correction by driving the variable apical angle prism 1 via the stepping motors 4 and 6 is set to be equal to or smaller than the pixel pitch on the CCD 70, a smooth, natural image can be obtained even during the anti-vibration operation.

Although a technique seemingly similar to the above-mentioned device is disclosed in Japanese Laid-Open Patent Application No. 3-276981, the technique disclosed in Japanese Laid-Open Patent Application No. 3-276981 has been made to increase the resolution in such a manner that an image formed between pixels of an image pickup device is guided to a pixel by rotating a transparent refraction plate to obtain an image signal between pixels. However, the present invention has been made to prevent a large shift of an image upon movement of the optical correction means by a minimum control unit, and to obtain a smooth, natural image, in such a manner that the minimum control unit of the optical correction means used in image-blur correction is set to be equal to or smaller than the pixel pitch of the image pickup device upon conversion of the minimum control unit into a change in imaging position on the image pickup device. Therefore, as is apparent from the above description, the object and technical content of above-mentioned technique are quite different from those of the present invention.

As described above, the sixth embodiment of the present invention comprises control means for setting a minimum control amount of optical correction means via an actuator to be equal to or smaller than a pixel pitch of an image pickup device upon conversion of the minimum control amount into a change in imaging position on the image pickup device. Thus, the minimum control amount used in control of the optical correction means on the basis of an output signal from vibration detection means is set to be equal to or smaller than the pixel pitch of the image pickup device upon conversion of the minimum control amount to a change in imaging position on the image pickup device.

Therefore, an image obtained upon execution of image-blur correction can become a smooth, natural image in place of a stiff, unnatural image.

(Seventh Embodiment)

The seventh embodiment of the present invention will be described below with reference to FIG. 15.

Figure 15:
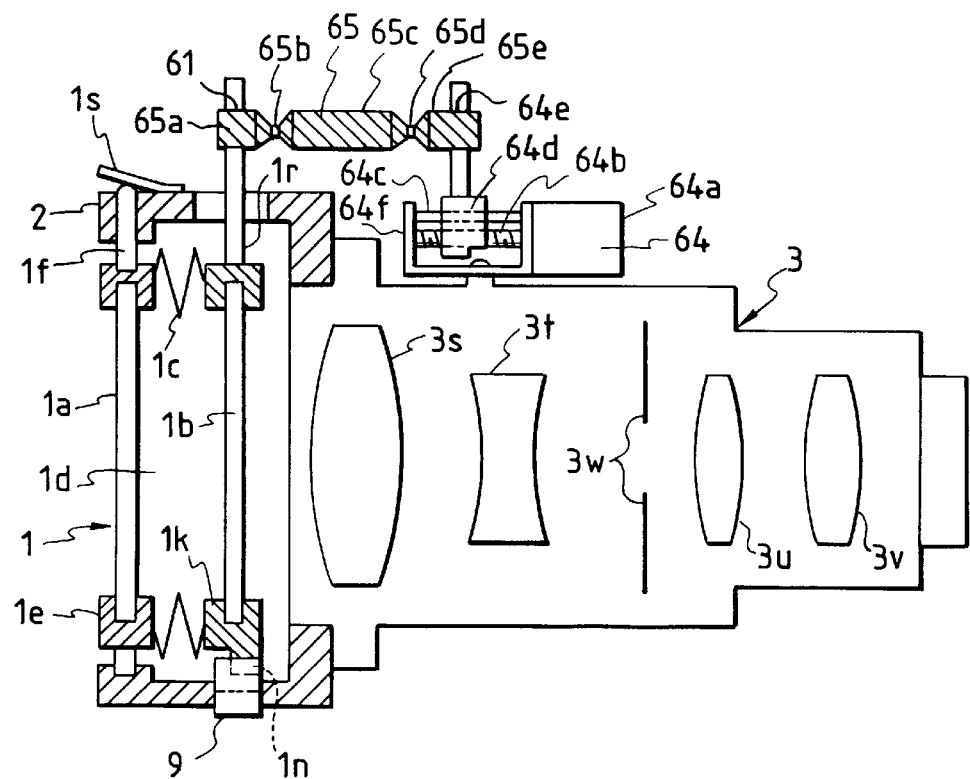
FIG. 15 is a sectional view showing main part of an anti-vibration device according to the seventh embodiment of the present invention.

The same reference numerals in FIG. 15 denote the same parts as in the first embodiment of the present invention shown in FIGS. 1 and 2, and a detailed description thereof will be omitted. Since anti-vibration operation control is the same as that in the first embodiment described above, a detailed description thereof will be omitted. Furthermore, although FIG. 15 shows a mechanism for suppressing a vibration in the vertical direction (to be referred to as a pitch direction hereinafter) of a screen, a mechanism for suppressing a vibration in the horizontal direction (to be referred to as a yaw direction hereinafter) of the screen has the same mechanism as that shown in FIG. 15.

Referring to FIG. 15, an anti-vibration device comprises the variable apical angle prism 1, a first stepping motor 64, and a first power transmission lever 65. A hole 61 is formed in the projecting portion 1r of the second holding lens barrel 1k, having a function of changing the optical axis in the vertical direction of the screen, of the variable apical angle prism 1. The first stepping motor 64 is constituted by a motor portion 64a, a lead screw 64b arranged integrally with the rotational shaft of a rotor (not shown) of the motor portion 64a, a guide bar 64c extending parallel to the lead screw 64b, a lead nut 64d having a screw portion threadably engaged with the lead screw 64b, a spring portion for biasing the screw portion against the lead screw 64b, and a first hole fitted with the guide bar 64c, and a housing 64f which axially support the lead screw 64b, and is fixed with the guide bar 64c. The first stepping motor 64 is fixed to the lens barrel 3 by known means (e.g., by fastening screws). The lead nut 64d of the first stepping motor 64 is formed with a second hole 64e.

The first power transmission lever 65 consists of, e.g., a polyacetal resin, and has a relatively large-diameter first expansion portion 65a, a small-diameter first constricted portion 65b, a relatively large-diameter second expansion portion 65c, a small-diameter second constricted portion 65d, and a relatively large-diameter third expansion portion 65e. The first expansion portion 65a of the first power transmission lever 65 is fixed to the hole 61 formed in the projecting portion 1r of the second holding lens barrel 1k of the variable apical angle prism 1 by press fitting. The third expansion portion 65e of the first power transmission lever 65 is fixed to the second hole 64e formed in the lead nut 64d of the first stepping motor 64 by press fitting.

An operation associated with power transmission of the seventh embodiment of the present invention shown in FIG. 15 will be described below.

As has been described above in the first embodiment, when the first stepping motor 64 is driven based on the output from the vibration sensor, the lead nut 64d moves in the axial direction of the guide bar 64c, and the power transmission lever 65 fixed to the lead nut 64d pushes (or pulls) the projecting portion 1r of the second holding lens barrel 1k of the variable apical angle prism 1. As a result, the second holding lens barrel 1k of the variable apical angle prism 1 is rotated about the shaft 1q (not shown in FIG. 7), thus changing the direction of the optical axis. In this case, although the moving direction of the lead nut 64d does not coincide with the moving direction of the projecting portion 1r of the second holding lens barrel 1k of the variable apical angle prism 1, a difference between the two direction is absorbed since the first power transmission lever 65 flexes at its first and second constricted portions 65b and 65d, and the apical angle of the variable apical angle prism 1 is smoothly changed upon rotation of the stepping motor 64.

As described above, according to the seventh embodiment of the present invention, since the driving power of the motor can be used to change the apical angle of the variable apical angle prism by a compact, simple mechanism, a compact, inexpensive anti-vibration photographing apparatus can be provided.

(Eighth Embodiment)

In the first and seventh embodiments described above, the guide bar for guiding the lead nut as moving means is fixed to the motor. Alternatively, the guide bar may be fixed to the lens barrel. Also, a lever for coupling the moving means and the holding lens barrel of the variable apical angle prism may employ an elastic member such as a phosphor bronze plate.

The eighth embodiment of the present invention will be described below with reference to FIGS. 16 and 17. In this embodiment, the guide bar is fixed to the lens barrel, and power conversion means for interlocking the moving means with the holding lens barrel of the variable apical angle prism employs an elastic member.

Figure 16:
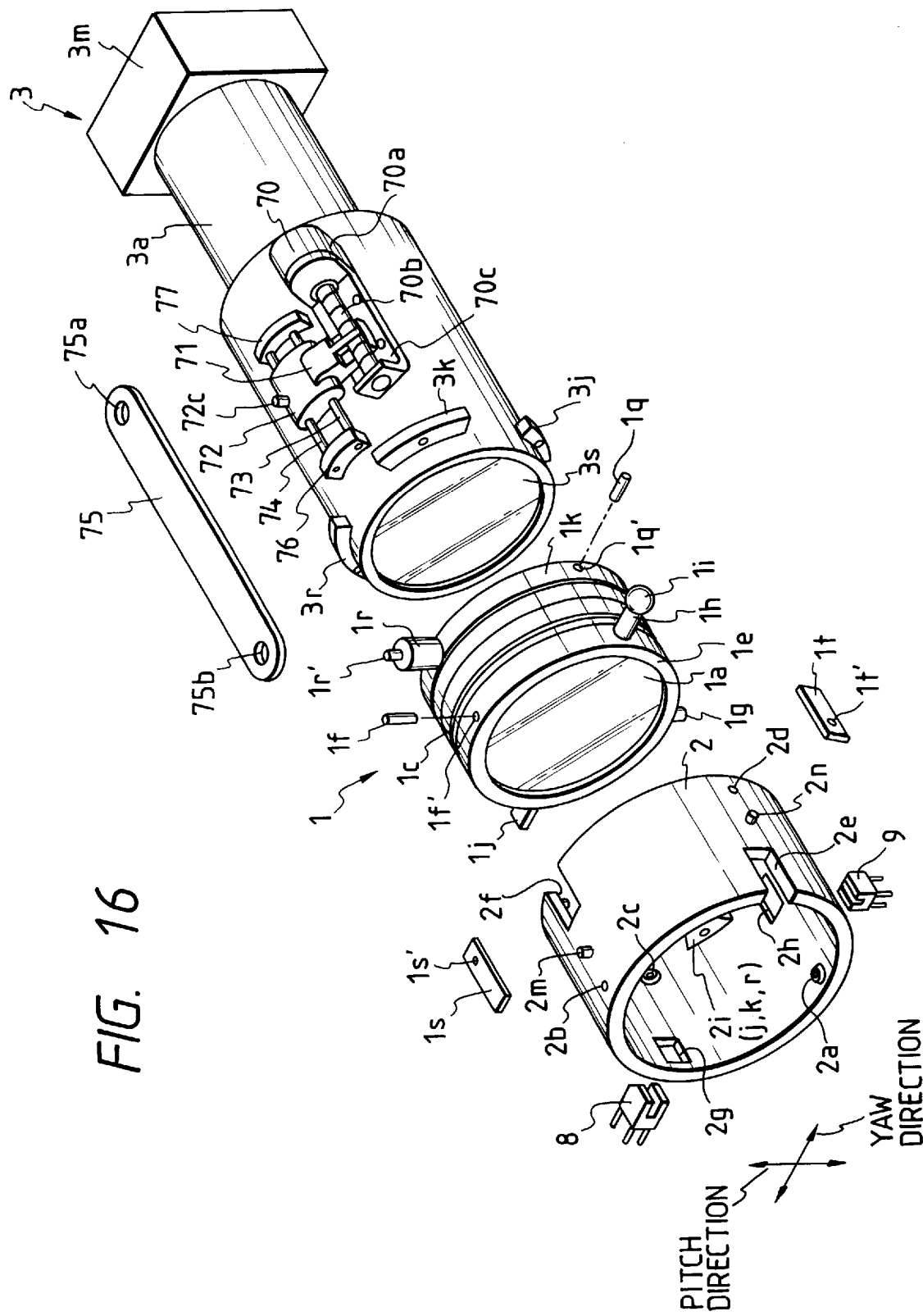
FIG. 16 is an exploded perspective view of an anti-vibration device according to the eighth embodiment of the present invention.

The same reference numerals in FIG. 16 denote the same parts as in the first embodiment of the present invention described above, and a detailed description thereof will be omitted. Although FIG. 16 illustrates a mechanism for suppressing a vibration in the pitch direction, a mechanism for suppressing a vibration in the yaw direction is the same as that shown in FIG. 16

FIG. 16 is an exploded perspective view of main part of the eighth embodiment of the present invention An anti-vibration device shown in FIG. 16 comprises the variable apical angle prism 1, the lens barrel 3, a stepping motor 70, a rack 71, a movable piece 72, first and second guide bars 73 and 74, a coupling lever 75, and projections 76 and 77 for respectively supporting the first and second guide bars.

The stepping motor 70 is constituted by a motor portion 70a as a known PM type stepping motor, a lead screw 70b arranged integrally with the rotor shaft of the motor portion 70a, and a mounting angle 70c having a bearing for axially supporting the lead screw 70b.

Figure 17:
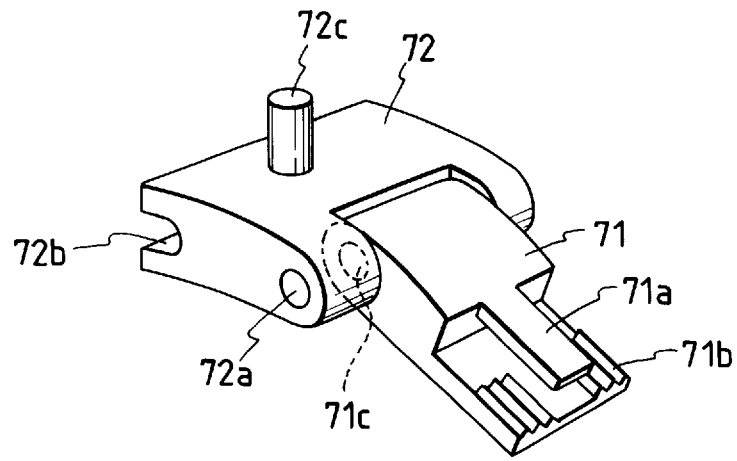
FIG. 17 is a perspective view of a power transmission means shown in FIG. 16.

FIG. 17 is an enlarged view of the rack 71 and the movable piece 72. The rack 71 and the movable piece 72 will be described below with reference to FIG. 17. The rack 71 consists of, e.g., a polyacetal resin, and has a biasing spring portion 71a, a screw portion 71b, and a hole 71c indicated by a broken line in FIG. 17. The movable piece 72 consists of, e.g., a polycarbonate resin, and has a hole 72a, an elongated groove 72b, and a boss 72c. In an assembling state shown in FIG. 16, the stepping motor 70 is fixed to the lens barrel 3 by means of, e.g., screws, and the screw portion 71b of the rack meshes with the lead screw 70b of the stepping motor 70 in a cluttering free state by means of the biasing spring portion 71a.

The first and second guide bars 73 and 74 consist of, e.g., stainless steel, and their surfaces are finished with high precision to have a high sliding property.

The first guide bar 73 is fitted in the first hole 72a of the movable piece 72 and the hole 71c of the rack. The second guide bar 74 is fitted in the elongated groove 72b of the movable piece 72. The first and second guide bars 73 and 74 are supported by the first and second support projections 76 and 77 integrally formed on the lens barrel 3, so that their axes extend parallel to the optical axis. With the above-mentioned arrangement, a mechanism for moving the movable piece 72 in the optical axis direction upon rotation of the stepping motor 70 is obtained. The reason why the rack 71 and the movable piece 72 are supported by the common first guide bar 73, and the movable piece 72 is supported by the second guide bar 74 is to prevent a vibration of the lead screw 70b of the stepping motor 70 from influencing the movement of the movable piece 72. This arrangement is an application of a technique disclosed in, e.g., U.S. Pat. No. 5,150,260 to the present applicant.

The coupling lever 75 is an elastic member consisting of, e.g., a phosphor bronze plate, and is formed with first and second holes 75a and 75b. The mounting boss 72c of the movable piece 72 is fitted in the first hole 75a of the coupling lever 75, and thereafter, the coupling lever 75 is fixed to the movable piece 72 by means of, e.g., thermal caulking. A boss portion 1r' of the projecting portion 1r formed on the second holding lens barrel 1k of the variable apical angle prism 1 is fitted in the second hole 75b of the coupling lever 75, and thereafter, the coupling lever 75 is fixed to the second holding lens barrel 1k of the variable apical angle prism 1 by means of, e.g., thermal caulking. Although the moving direction of the movable piece 72 does not coincide with the moving direction of the boss portion 1r' of the second holding lens barrel 1k of the variable apical angle prism 1, a difference between these two directions is absorbed since the coupling lever 75 consisting of an elastic material is flexed, and the apical angle of the variable apical angle prism 1 smoothly changes upon rotation of the stepping motor 70. In this case, if the flexure of the coupling lever 75 is too large or too small, the driving force cannot be smoothly transmitted. Therefore, the shape, thickness, and the like of the coupling lever 75 are designed to obtain a proper elastic deformation amount upon driving of the variable apical angle prism.

As described above, according to the eighth embodiment of the present invention, since the guide bar is fixed to the lens barrel, an anti-vibration device can be arranged in a very small space in the outer-diameter direction of the lens. In addition, since power conversion can be achieved by a very small part, i.e., a lever consisting of an elastic member, if the arrangement of this embodiment is used in, e.g., a video camera, a compact video camera with an anti-vibration function, which has excellent portability, can be provided.

(Ninth Embodiment)

Figure 18:
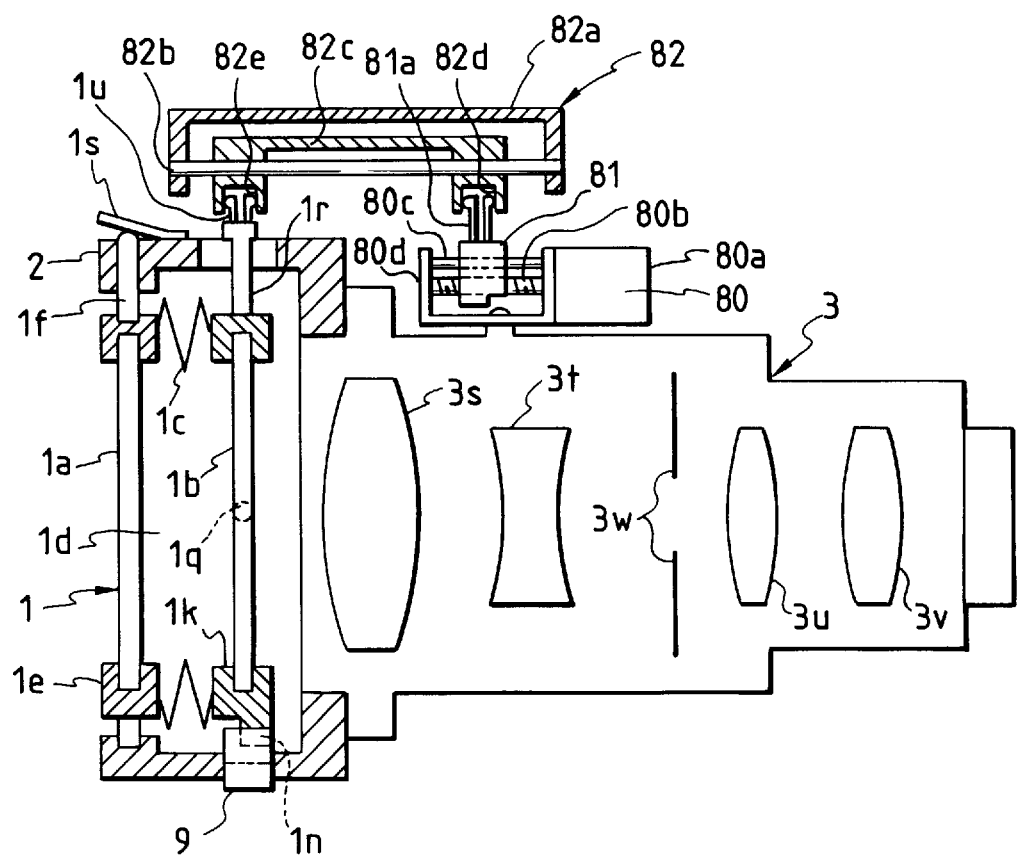
FIG. 18 is a sectional view showing main part of an anti-vibration device according to the ninth embodiment of the present invention.

In the first embodiment of the present invention, engagement between the lead nut as moving means, and the lever as power conversion means, and between the lever and the holding lens barrel of the variable apical angle prism is attained using spherical bearings. When a very small spherical bearing is used in a spring-charged state, the spring constant becomes undesirably large, and a stable anti-cluttering effect is often difficult to obtain. In such a case, a stable effect can be obtained if the arrangement according to the ninth embodiment of the present invention shown in FIG. 18 is employed. The ninth embodiment of the present invention will be described below with reference to FIG. 18.

Referring to FIG. 18, an anti-vibration device includes a first stepping motor 80, a lead nut 81, and a slider unit 82 serving as power conversion means. The slider unit 82 is constituted by a housing 82a, a guide bar 82b, and a slider 82c.

The lead nut 81 meshes with a lead screw 80a of the stepping motor 80, and moves along a guide bar 80b of the stepping motor 80 upon rotation of the stepping motor 80 in the same manner as the lead nut in the first and seventh embodiments described above.

The lead nut 81 has first to fourth expansion portions 81a having spring characteristics. The guide bar 82b is fixed to the housing 82a of the slider unit 82, and the slider 82c is axially supported by the guide bar 82b to be movable in the axial direction of the guide bar 82b. On the other hand, first to fourth expansion portions 1u having spring characteristics are also formed on the distal end portion of the projecting portion 1r of the holding lens barrel 1k of the variable apical angle prism 1.

The above-mentioned slider 82c has first and second grooves 82d and 82e. The expansion portions 81a of the lead nut 81 are fitted in the first groove 82d while biasing from the inner side toward the outer side by their spring characteristics. Also, the expansion portions 1u of the holding lens barrel 1k of the variable apical angle prism 1 are fitted in the second groove 82e of the slider 82c while biasing from the inner side toward the outer side by their spring characteristics. The housing 82a is fixed to the lens barrel 3 by means of, e.g., screws (not shown).

With the above-mentioned arrangement, when the stepping motor 80 is rotated, the lead nut 81 moves in substantially the optical axis direction, and the slider 82c moves accordingly in substantially the optical axis direction. Then, the driving force is transmitted to the variable apical angle prism 1, and the second holding lens barrel 1k of the variable apical angle prism 1 is rotated about the shaft 1q indicated by a broken line in FIG. 18. At this time, when the expansion portions 1u of the second holding lens barrel 1k of the variable apical angle prism 1 are shifted in the second groove 82e of the slider 82c while being flexed, rotation of the stepping motor 80 is transmitted to the holding lens barrel 1k of the variable apical angle prism 1 with a small loss.

According to the ninth embodiment of the present invention described above, after the stepping motor is fixed to the lens barrel, the slider unit as the power conversion means can be assembled by a simple operation, i.e., by fitting the expansion portions of the lead nut and the expansion portions of the holding lens barrel of the variable apical angle prism in the corresponding grooves of the slider, and fixing the housing to the lens barrel. Therefore, an inexpensive anti-vibration photographing apparatus with stable performance can be provided.

(10th Embodiment)

In the first and seventh to ninth embodiments of the present invention described above, the motor shaft is arranged to extend in a direction substantially parallel to the optical axis. However, an anti-vibration photographing apparatus according to the present invention is not limited to the arrangement of the motor.

The 10th embodiment of the present invention will be described below with reference to FIGS. 19A and 19B. In this embodiment, the motor shaft is arranged to extend in a direction, which is not parallel to the optical axis. Although FIGS. 19A and 19B illustrate only a mechanism for suppressing a vibration in the pitch direction, a mechanism for suppressing a vibration in the yaw direction is the same as that shown in FIGS. 19A and 19B.

Figure 19A:
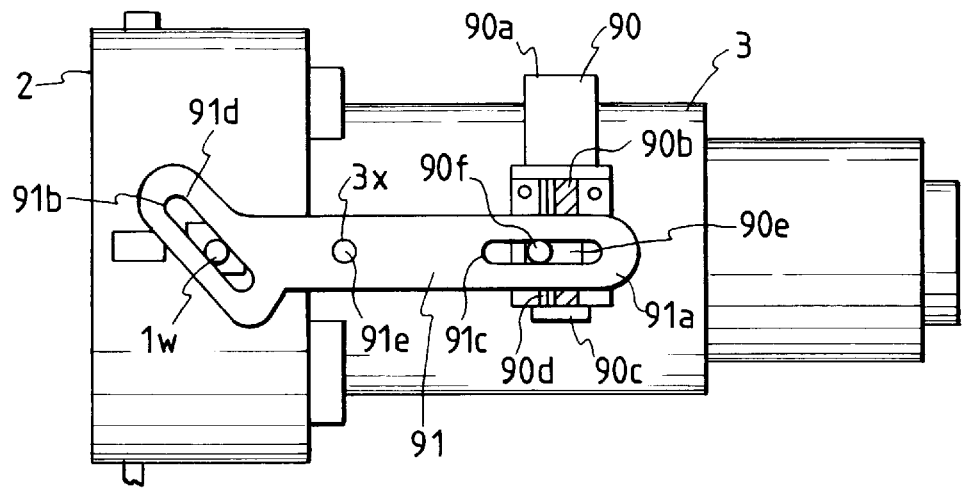
FIGS. 19A and 19B show main part sections of an anti-vibration device according to the 10th embodiment of the present invention.
Figure 19B:
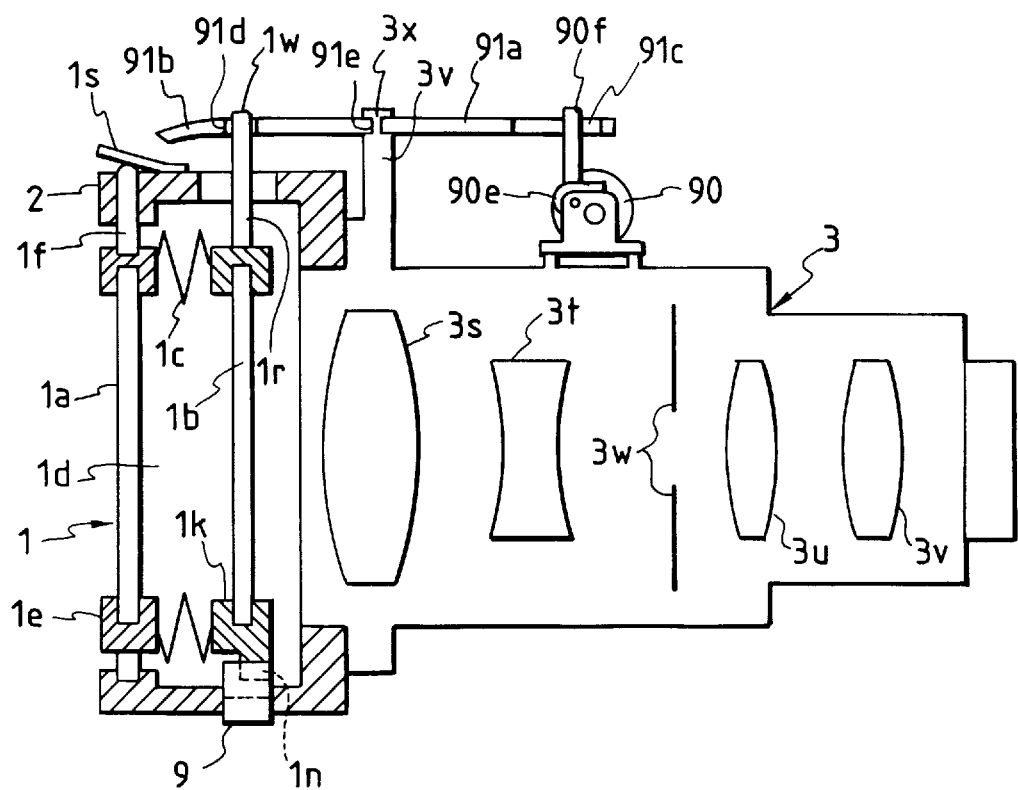

Referring to FIGS. 19A and 19B, the second holding lens barrel 1k of the variable apical angle prism 1 has the projecting portion 1r with a columnar distal end portion 1w. A supporting column portion 3v is formed on the lens barrel 3, and the distal end portion of the supporting column portion 3v has a shaft portion 3x.

The anti-vibration device includes a motor 90 and a lever 91.

The motor 90 has a motor portion 90a, a lead screw 90b, a mounting plate 90c for axially supporting the lead screw 90b, a guide bar 90d, and a lead nut 90e. The lead nut 90e moves in the axial direction of the guide bar 90d upon rotation of the motor 90.

The lead nut 90e has a shaft portion 90f, which is engaged with a first cam hole 91c of the lever 91. The lever 91 has a fulcrum hole 91e, which is engaged with the shaft portion 3x of the lens barrel 3. When the distal end of the shaft portion 3x of the lens barrel 3 is fixed by known means (e.g., thermal caulking), the lever 91 is axially supported by the shaft portion 3x of the lens barrel 3 without causing cluttering so as to be rotatable about the shaft portion 3x of the lens barrel 3. Furthermore, the lever 91 has a second cam hole 91d, which is engaged with the shaft portion 1w of the second holding lens barrel 1k of the variable apical angle prism 1.

With the above-mentioned arrangement, when the motor 90 is rotated, the lead nut 90e moves in the axial direction of the guide bar of the motor 90, and the lever 91 is rotated about the fulcrum hole 91e in synchronism with the movement of the lead nut 90e. Upon rotation of the lever 91, the shaft portion 1w of the second holding lens barrel 1k of the variable apical angle prism 1 is pushed by the side surface of the second cam hole 91d of the lever 91, thereby changing the apical angle of the variable apical angle prism 1. In this arrangement, a more smooth operation is assured when a peripheral portion 91b of the second cam hole 91d of the lever 91 is rounded so that the second cam surface of the lever 91 always extends perpendicularly to the shaft portion 1w of the second holding lens barrel 1k of the variable apical angle prism 1.

In the 10th embodiment of the present invention described above, since the motor need not be arranged to extend parallel to the optical axis, when the arrangement of this embodiment is applied to a video camera, the degree of freedom of an arrangement of video camera components around the lens can be increased. As a result, a video camera can be rendered compact.

In each of the embodiments of the present invention described above, open-loop control using the stepping motors has been exemplified. For example, known DC motors or ultrasonic motors may be used as a power source, and closed-loop control for detecting the apical angle of the variable apical angle prism to execute control may be employed.

In each of the embodiments of the present invention described above, the effects obtained when the present invention is applied to a video camera have been described. When the present invention is applied to other optical devices such as a silver chloride camera, a telescope which does not perform any photographing operation, and the like, the same effects as described above can be obtained.

As described above, since the anti-vibration device according to each of the seventh to tenth embodiments of the present invention comprises driving power conversion means for converting a driving force of driving means into a driving force in an operation direction of vibration correction means. For this reason, when a vibration correction mode is disabled, the vibration correction means can be fixed without deteriorating the response characteristics of the operation of the vibration correction means in the vibration correction mode, without arranging any special-purpose member for fixing the vibration correction means, and without wastefully consuming electrical power for fixing the vibration correction means. With the above-mentioned conversion means, the degree of freedom of the arrangement of the driving means can be increased, and the device can be rendered compact in the outer-diameter direction.

(11th Embodiment)

The 11th embodiment of the present invention comprises power supply stopping means for, when a non-vibration state is detected based on a signal from vibration detection means, driving an actuator for driving optical correction means to fix the optical correction means at a predetermined position, and stopping power supply to the actuator. In a non-vibration state, the optical correction means is moved to the predetermined position by an actuator such as an open-loop controlled stepping motor for driving the optical correction means, the optical correction means is fixed at that position by the torque of the actuator, and thereafter, power supply to the actuator is stopped.

Also, the 11th embodiment of the present invention comprises power supply stopping means for, when a non-vibration state is detected for a predetermined period of time based on a signal from vibration detection means, driving an actuator for driving optical correction means to locate the optical correction means at the movable center, driving an actuator for driving fixing means to fix the optical correction means, and then stopping power supply to the actuator for driving the optical correction means. In a non-vibration state, the optical correction means is located at the movable center by an actuator such as a closed-loop controlled stepping motor for driving the optical correction means, mechanical fixing means is driven by an actuator for fixing the fixing means to fix the optical correction means at that position, and thereafter, power supply to the actuator for driving the optical correction means is stopped.

The operation of an anti-vibration device according to the 11th embodiment of the present invention will be described below with reference to the flow chart in FIGS. 20A to 20C. Note that the arrangement of the anti-vibration device of the 11th embodiment is the same as that of the first embodiment shown in FIGS. 1 to 3.

As for an operation, the flow shown in FIG. 5 interrupts the flow chart (main loop) of FIG. 20 showing the anti-vibration operation, and interrupt processing for driving the motors on the basis of information in the main loop is executed.

Since steps 600, 601, 607, 608, and 619 to 629 in FIG. 20 are the same as steps 100, 101, 102, 103, and 104 to 114 in FIGS. 4A and 4B showing the anti-vibration operation of the first embodiment, a detailed description thereof will be omitted, and only steps different from those in FIGS. 4A and 4B will be described below. In these steps, when it is detected that no camera shake occurs, power supply is stopped accordingly.

[Step 602] It is checked if an anti-vibration switch 18 is ON. If YES in step 602, an indicator 16b for informing that an anti-vibration operation is being executed is turned on, and the flow advances to step 607; otherwise, the flow advances to step 603.

[Step 603] The yaw and pitch stepping motors 4 and 6 are moved to the initial positions (reset positions) via the first and second driving circuits 13 and 14 as in step 600.

[Step 604] Yaw and pitch counters are reset.

[Step 605] The driving operations of the yaw and pitch stepping motors 4 and 6 are stopped.

[Step 606] It is checked if the anti-vibration switch 18 is ON. If NO in step 606, the flow waits until the switch 18 is turned on. When the switch 18 is turned on, the flow advances to step 607.

[Step 609] If both the angular velocity signals in the yaw and pitch directions are equal to or smaller than a constant C (arbitrary value), the flow advances to step 610; otherwise, the flow advances to step 618.

[Step 610] The content of a stop counter is incremented by 1.

[Step 611] It is checked if the content of the stop counter is equal to a constant B (arbitrary value). If YES in step 611, the flow advances to step 612; otherwise, the flow advances to step 619.

[Step 612] The yaw and pitch stepping motors 4 and 6 are moved to the reset positions via the first and second driving circuits 13 and 14.

[Step 613] The yaw and pitch counters are reset

[Step 614] The driving operations of the yaw and pitch stepping motors 4 and 6 are stopped. In this case, in order to inform that the anti-vibration operation is stopped since a vibration state is equal to or lower than a predetermined level although the anti-vibration switch 18 is ON, the indication state of the indicator 17b is switched from the ON state to a flickering state.

[Step 615] The angular velocity signals in the yaw and pitch directions are fetched from the vibration gyros 10 and 11 via the buffer amplifiers 15 and 16 again, and are A/D-converted by internal A/D converters.

[Step 616] The angular velocity signals in the yaw and pitch directions, which are A/D-converted in step 615, are integrated to be converted into angular deviation signals.

[Step 617] If both the angular velocity signals in the yaw and pitch directions are equal to or smaller than the constant C, the flow advances to step 614. Otherwise, the indicator 17b is set in an ON state to indicate that the anti-vibration operation is started, and the flow returns to step 618.

[Step 618] The stop counter is cleared.

Figure 20B:
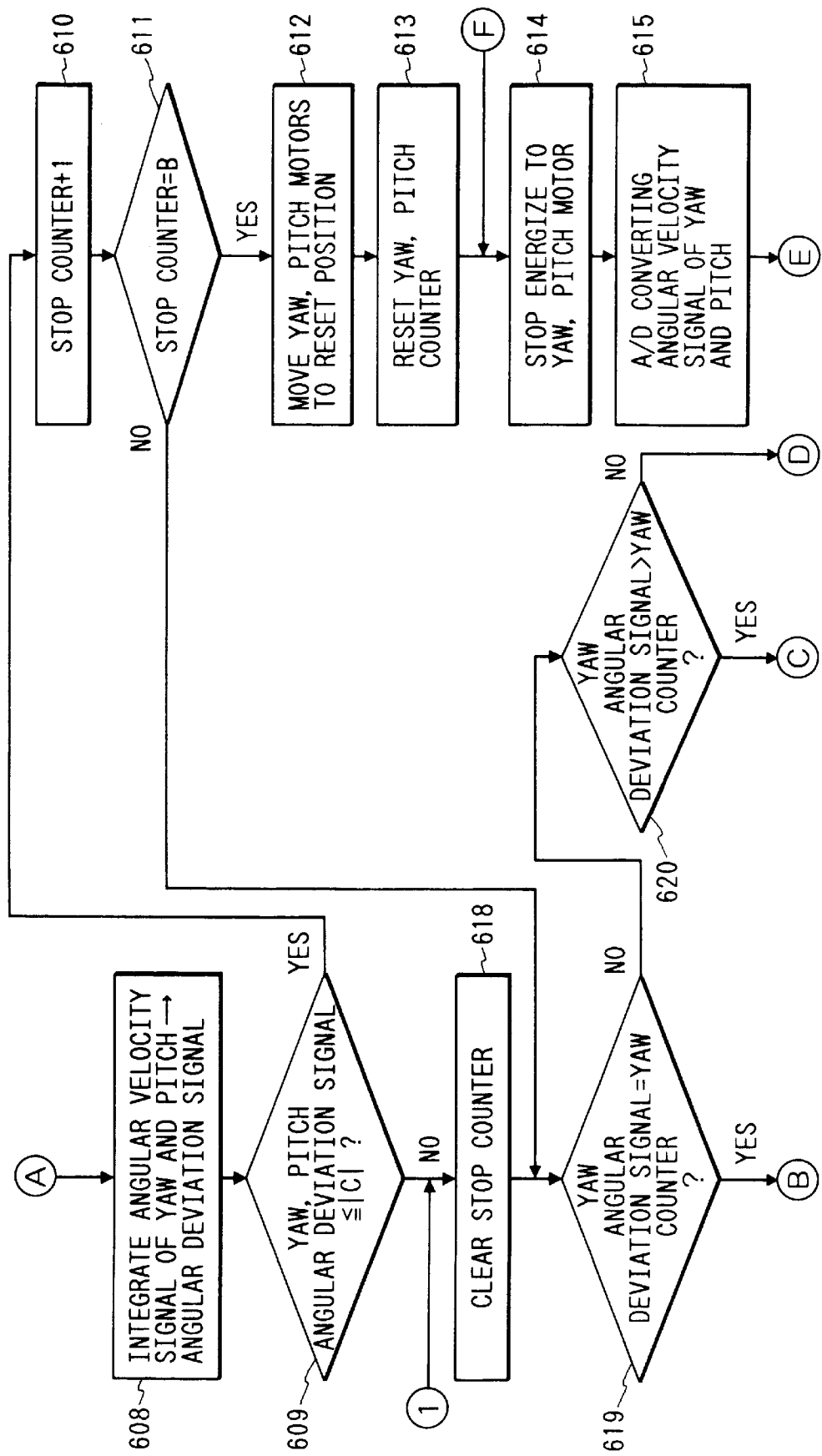
FIG. 20, which consists of FIGS. 20A to 20C, is a flow chart showing an operation of an anti-vibration device according to the 11th embodiment of the present invention.
Figure 20C:
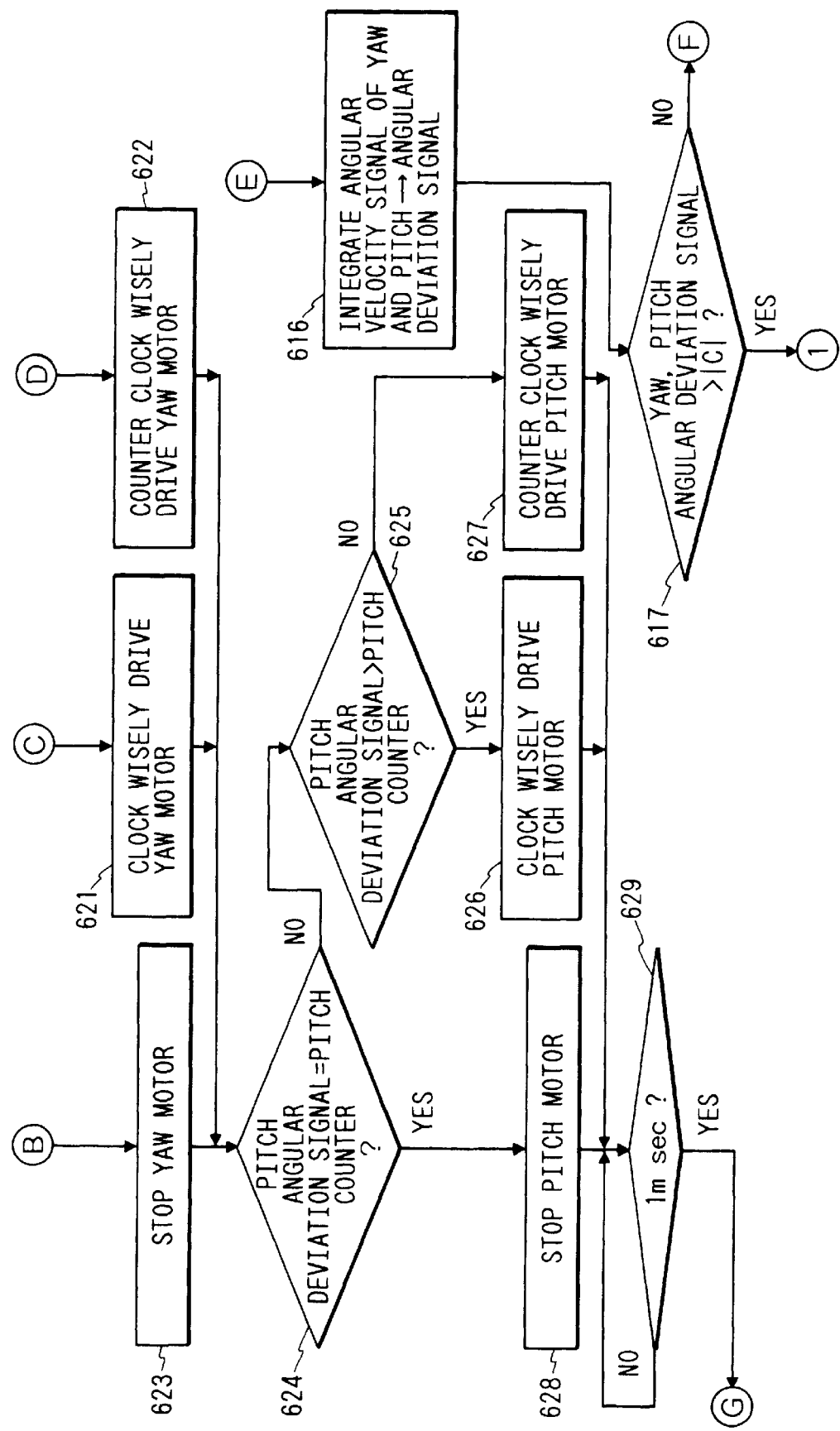

As in the first embodiment, interrupt processing for generating signals for actually driving the stepping motors 4 and 6 for performing the driving operations in the pitch and yaw directions as in FIG. 5 is executed at an arbitrary timing in the main loop shown in FIGS. 20A to 20C at a predetermined time interval. The interrupt processing forms clock pulses for driving the motors on the basis of information in the main loop shown in FIGS. 20A to 20C, and up/down-counts the yaw and pitch counters as in the first embodiment described above.

The anti-vibration control is achieved by executing the series of operations shown in FIGS. 20A to 20C and 5. The operation of the anti-vibration device will be summarized below with reference to FIG. 21, and FIGS. 22A and 22B.

Figure 21:
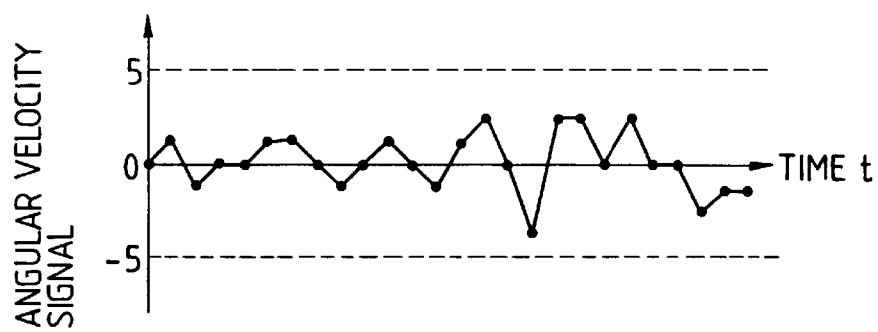
FIG. 21 is a chart showing an angular velocity signal obtained by the anti-vibration device according to the 11th embodiment of the present invention.
Figure 22A:
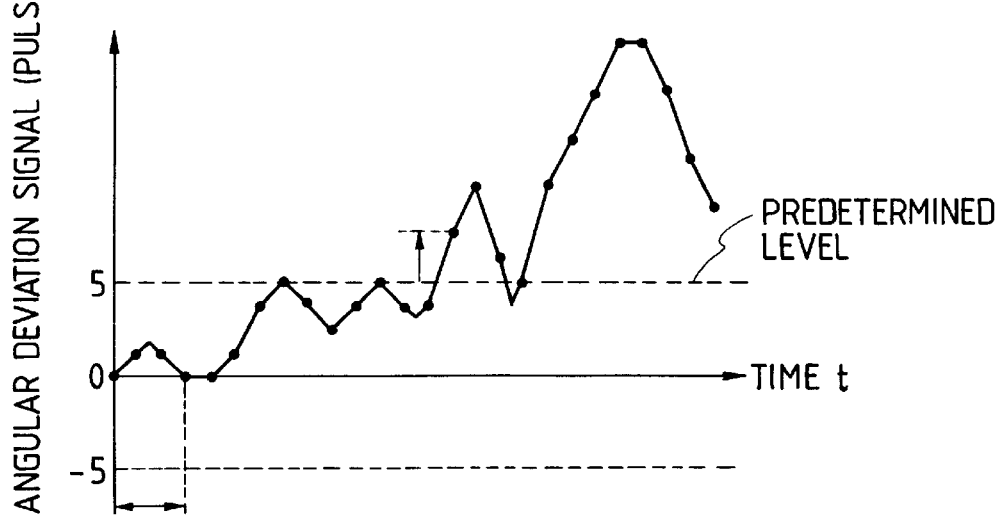
FIGS. 22A and 22B show an angular deviation signal obtained by integrating the angular velocity signal shown in FIG. 21, and an angular deviation signal actually used for driving a motor.
Figure 22B:
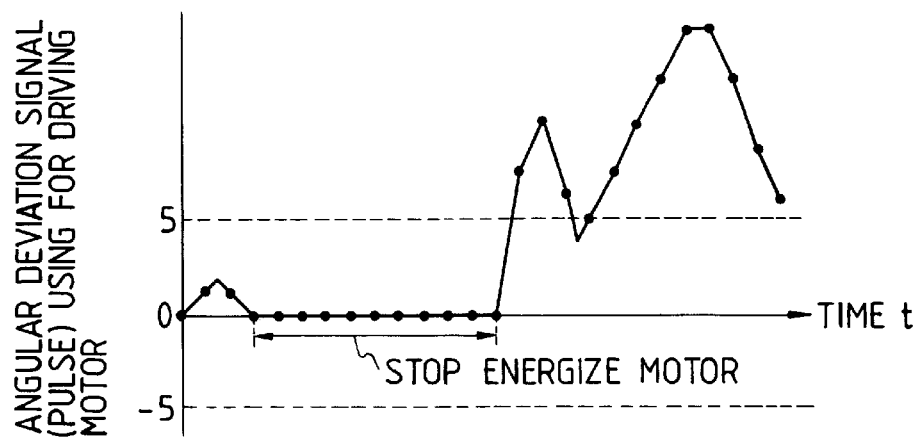

Time is plotted along the abscissa of each of FIG. 21 and FIGS. 22A and 22B, the voltage is plotted along the ordinate of FIG. 21, and the apical angle (deviation angle from the movable center) of the variable apical angle prism 1 is plotted along the ordinate of FIGS. 22A and 22B.

When a vibration acts on the video camera due to, e.g., a camera shake, the first or second vibration gyro 10 or 11 outputs a voltage (angular velocity signal), as shown in FIG. 21. Upon reception of this signal, the control circuit 12 normally performs integral processing therein, and outputs a deviation signal generated by the processing to the first or second driving circuit 13 or 14 to control the first or second stepping motor 4 or 6 so as to move the variable apical angle prism 1 to a position indicated by a solid curve in FIG. 22A with respect to the time.

In contrast to this, in the 11th embodiment, in place of executing anti-vibration control for driving the first or second stepping motor 4 or 6 in accordance with the deviation signal obtained by integrating the angular velocity signal, as shown in FIG. 22A, when the angular deviation signal is equal to or lower than a predetermined level (noise level: i.e., equal to or lower than the constant C in this embodiment), and when this state continues for a predetermined period of time (when the content of the stop counter reaches the constant B in this embodiment), as shown in FIG. 22B, energization to the motor is stopped, in other words, anti-vibration control is stopped during this interval. When the angular deviation signal exceeds the predetermined level again, energization to the first or second stepping motor 4 or 6 is restarted to restart the anti-vibration control.

As described above, according to the 11th embodiment, when the angular deviation signal becomes equal to or lower than the predetermined level (equal to or lower than a level considered as a non-vibration state) for a predetermined period of time, energization to the stepping motor is temporarily stopped until the angular deviation signal exceeds the predetermined level later, thereby fixing the variable apical angle prism at a predetermined position (movable center). For this reason, a clear image free from noise level can be photographed even when the anti-vibration mode is ON.

Since the above-mentioned anti-vibration control is performed, energy savings can be attained.

Since the indication state of the indicator 17b in the anti-vibration operation is changed from that when the anti-vibration operation is temporarily stopped since a vibration state is equal to or lower than a predetermined level, a photographer can always know an anti-vibration control state, resulting in convenience for a user.

(12th Embodiment)

In the 12th embodiment, once an angular deviation signal having a predetermined level is obtained after energization to the stepping motor is stopped, anti-vibration control is immediately restarted. Alternatively, anti-vibration control may be restarted based on the same decision as that in a condition for stopping motor energization. This processing will be described below as the 12th embodiment.

Figure 23:
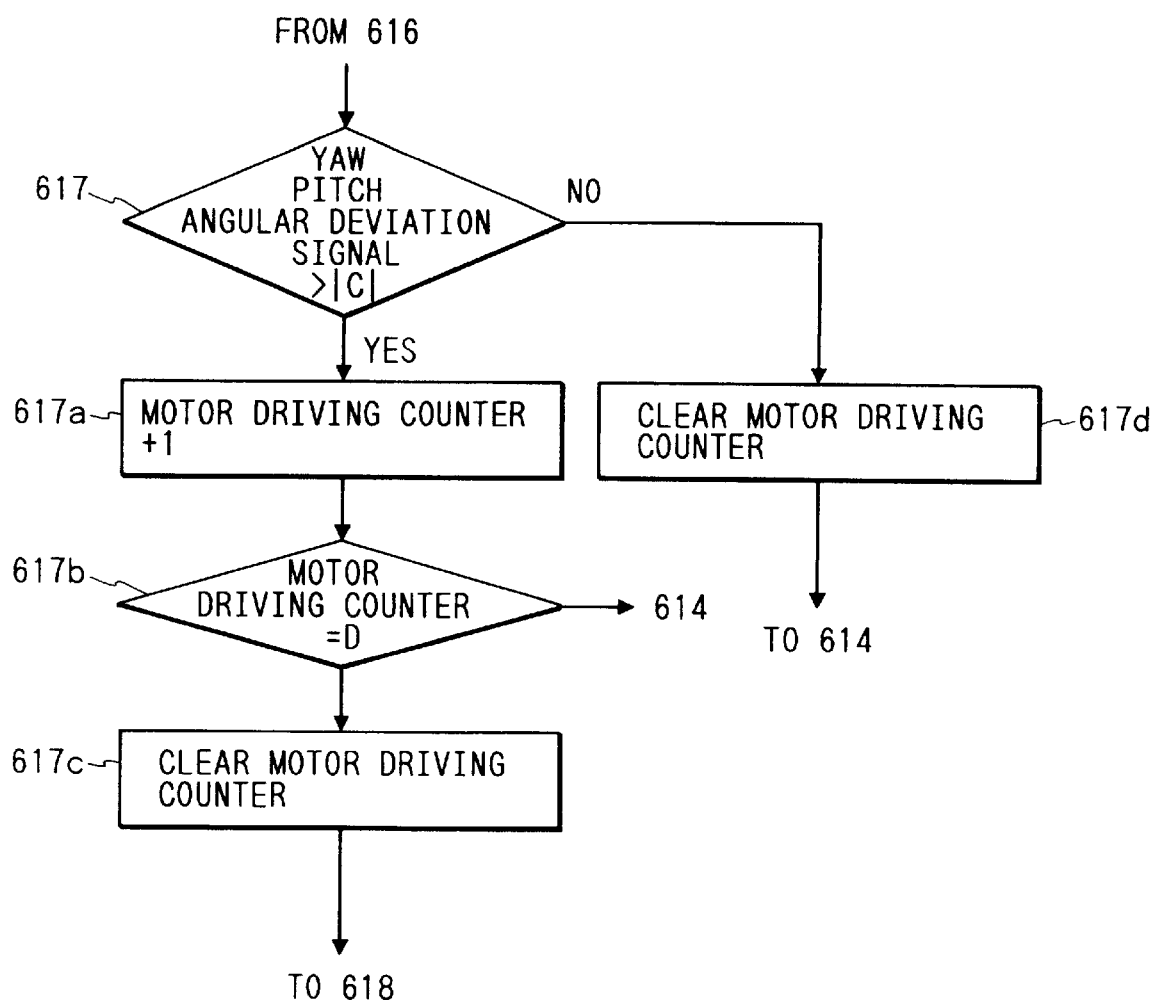
FIG. 23 is a flow chart showing a principal operation of an anti-vibration device according to the 12th embodiment of the present invention.

FIG. 23 is a flow chart showing an operation of main part of the 12th embodiment of the present invention, and the same steps as in the 11th embodiment are omitted.

[Step 617] If both the angular velocity signals in the yaw and pitch directions are equal to or smaller than the constant C, the flow advances to step 617d; otherwise, the flow advances to step 617a.

[Step 617a] Since the angular velocity signals in the yaw and pitch directions are larger than the constant C, the content of a motor driving counter is incremented by 1, and the flow advances to step 617b.

[Step 617b] It is checked if the content of the motor driving counter is equal to a constant D (arbitrary value). If YES in step 617b, the flow returns to step 614 to restart anti-vibration control; otherwise, the flow advances to step 617c.

[Step 617c] The motor driving counter is cleared, and the flow advances to step 618.

[Step 617d] Since both the angular velocity signals in the yaw and pitch directions are equal to or smaller than the constant C, the motor driving counter is cleared, and the flow returns to step 614 to restart anti-vibration control.

When the flow shown in FIG. 23 is added to the flow chart in FIGS. 20A to 20C, the 12th embodiment is realized. The operation of the anti-vibration device will be summarized below with reference to FIG. 24 and FIGS. 25A and 25B.

As in FIG. 21 and FIGS. 22A and 22B, time is plotted along the abscissa of each of FIG. 24 and FIGS. 25A and 25B, the voltage is plotted along the ordinate of FIG. 24, and the apical angle (deviation angle from the movable center) of the variable apical angle prism 1 is plotted along the ordinate of FIGS. 25A and 25B.

When a vibration acts on the video camera due to, e.g., a camera shake, the first or second vibration gyro 10 or 11 outputs a voltage (angular velocity signal), as shown in FIG. 24. Upon reception of this signal, the control circuit 12 normally performs integral processing therein, and outputs a deviation signal generated by the processing to the first or second driving circuit 13 or 14 to control the first or second stepping motor 4 or 6 so as to move the variable apical angle prism 1 to a position indicated by a solid curve in FIG. 25A with respect to the time.

In contrast to this, in the 12th embodiment, in place of executing anti-vibration control for driving the first or second stepping motor 4 or 6 in accordance with the deviation signal obtained by integrating the angular velocity signal, as shown in FIG. 25A, when the angular deviation signal is equal to or lower than a predetermined level (noise level: i.e., equal to or lower than the constant C in this embodiment), and when this state continues for a predetermined period of time (when the content of the stop counter reaches the constant B in this embodiment), as shown in FIG. 25B, energization to the motor is stopped, in other words, anti-vibration control is stopped during this interval. When the angular deviation signal exceeds the predetermined level again for a predetermined period of time (the constant D in this embodiment), energization to the first or second stepping motor 4 or 6 is restarted to restart anti-vibration control.

As described above, according to the 12th embodiment, when the angular deviation signal becomes equal to or lower than the predetermined level (i.e., equal to lower than a level considered as a non-vibration state), energization to the stepping motor is temporarily stopped until the angular deviation signal exceeds the predetermined level for a predetermined period of time, thereby fixing the variable apical angle prism at a predetermined position (movable center). For this reason, a clear image free from noise level can be photographed even when the anti-vibration mode is ON.

In the 12th embodiment, as is apparent from comparison between FIGS. 22B and 25B, the energization stop time for the motor is prolonged as compared to the 11th embodiment. This is because, in place of restarting anti-vibration control immediately after the angular deviation signal exceeds the predetermined level, the anti-vibration control is restarted after this state continues for a predetermined period of time. Therefore, in view of energy savings, the effect of the 12th embodiment is superior to that of the 11th embodiment.

(13th Embodiment)

In the 11th and 12th embodiments, an actuator for driving a variable apical angle prism comprises an open-loop controllable stepping motor. Alternatively, the variable apical angle prism may be directly mechanically connected to a coil, and anti-vibration control may be executed by energizing the coil.

Figure 26:
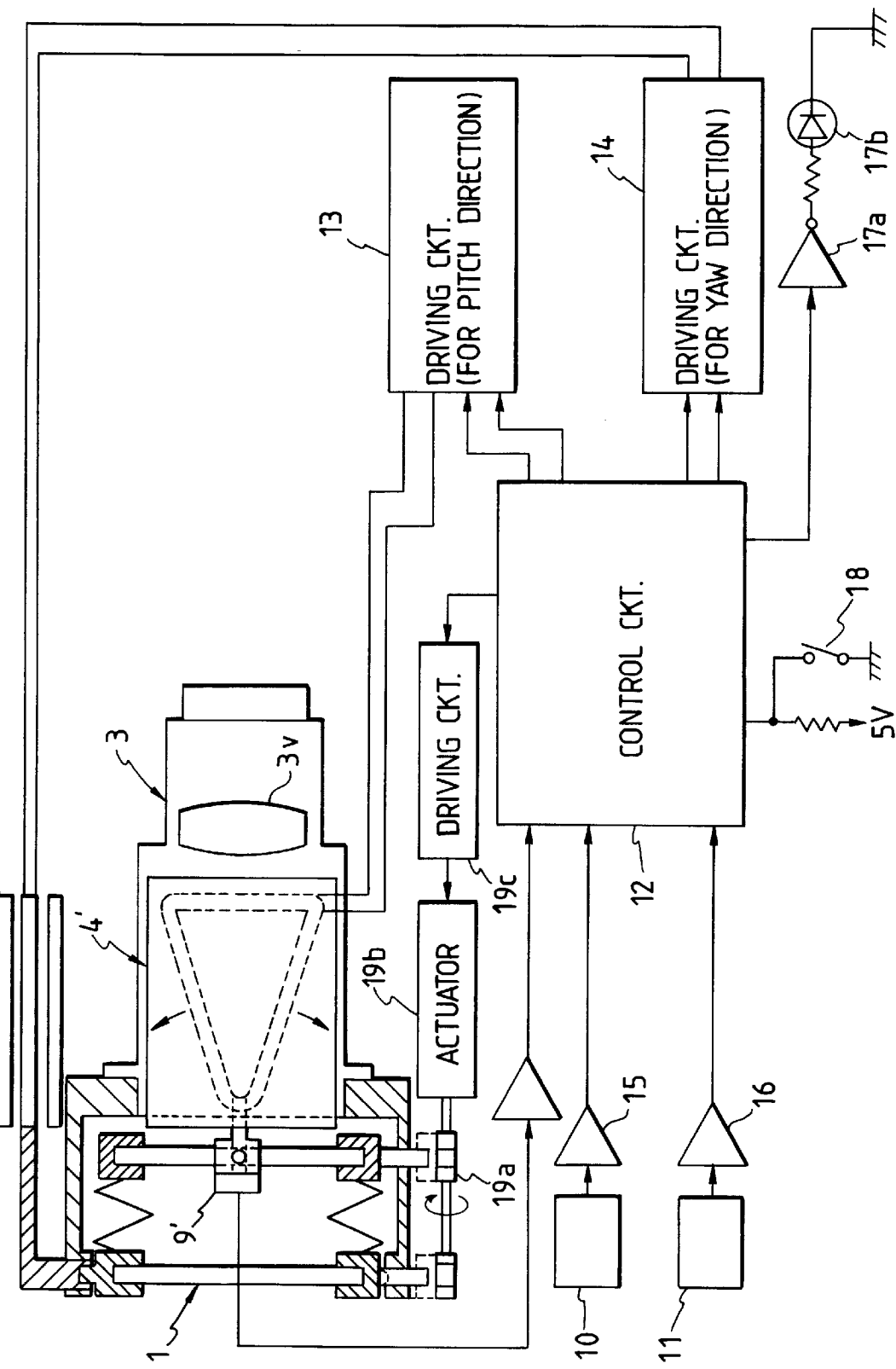
FIG. 26 is a sectional view of an anti-vibration device according to the 13th embodiment of the present invention, and a block diagram showing electrical blocks thereof.

FIG. 26 shows a schematic arrangement of an anti-vibration device with the above-mentioned arrangement according to the 13th embodiment of the present invention.

Differences from the 11th embodiment are that the stepping motors 4 and 6 are replaced with torquers 4' and 6', the photointerrupter 9 as the reset position detection element is replaced with an optical position encoder (e.g., a PSD) 9', and a mechanical lock mechanism 19a for fixing the variable apical angle prism 1, an actuator 19b for driving the mechanical lock mechanism 19a, and a driving circuit 19c for driving the actuator 19b are added.

In this embodiment, when the vibration level becomes equal to or lower than a predetermined level, the variable apical angle prism 1 is located at the movable center by the torquers 4' and 6', and the optical position encoder 9'. In this state (electrically locked state), the actuator 19b is driven via the driving circuit 19c to operate the mechanical lock mechanism 19a, thereby fixing the variable apical angle prism 1. Thereafter, power supply to the torquers 4' and 6' is stopped.

With the arrangement shown in FIG. 26, when energization to the actuator 19b for driving the variable apical angle prism 1 is stopped, the variable apical angle prism 1 becomes an inverted-V shape due to its weight, and cannot be fixed at the movable center in an optimal state.

For this reason, after a recess portion of the mechanical lock mechanism 19a is rotated in the direction of an arrow, the variable apical angle prism 1 is fixed, and thereafter, energization to the actuator 19b is stopped, thereby fixing the variable apical angle prism 1 at the movable center, as shown in FIG. 26. Thus, the two glass plates as the constituting elements of the variable apical angle prism can be held parallel to each other, and a photographing operation in this state is not adversely influenced at all.

In this embodiment, once the mechanical lock mechanism 19a operates, and a predetermined period of time elapses, an anti-vibration operation disabled state is set, and the anti-vibration operation is not permitted unless the anti-vibration switch 19 is turned on again.

As described above, according to the 11th to 13th embodiments of the present invention, power supply stopping means for, when a non-vibration state is detected based on a signal from vibration detection means, driving an actuator for driving optical correction means to fix the optical correction means at a predetermined position, and stopping power supply to the actuator is provided. In a non-vibration state, the optical correction means is moved to the predetermined position by an actuator such as an open-loop controlled stepping motor for driving the optical correction means, the optical correction means is fixed at that position by the torque of the actuator, and thereafter, power supply to the actuator is stopped.

Also, power supply stopping means for, when a non-vibration state is detected for a predetermined period of time based on a signal from vibration detection means, driving an actuator for driving optical correction means to locate the optical correction means at the movable center, driving an actuator for driving fixing means to fix the optical correction means, and then stopping power supply to the actuator for driving the optical correction means is provided. In a non-vibration state, the optical correction means is located at the movable center by and actuator such as a closed-loop controlled stepping motor for driving the optical correction means, mechanical fixing means is driven by an actuator for fixing the fixing means to fix the optical correction means at that position, and thereafter, power supply to the actuator for driving the optical correction means is stopped.

Therefore, an anti-vibration operation can be performed without being influenced by noise level, and energy saving can be attained.

(Modification)

In each of the above embodiments, the variable apical angle prism is used as optical correction means However, the present invention is not limited to this. For example, the same effect can be obtained when a shift optical system which shifts in two different directions perpendicular to the photographing optical axis to attain an anti-vibration effect or an optical system for performing an anti-vibration operation by utilizing an inertia may be used.

As a power source for driving the optical correction means (variable apical angle prism), an electromagnetic motor is used. However, the present invention is not limited to this, and any other actuators such as an ultrasonic motor may be used as long as the actuator can be driven by pulse control.

As means for detecting a vibration, the vibration gyro, i.e., the angular velocity sensor is used. However, the present invention is not limited to this. For example, vibration sensors such as an acceleration sensor, a deviation sensor, and the like may be used, or an image blur may be directly detected.

What is claimed is:

1. An image blur prevention apparatus for use with a device which provides a vibration signal corresponding to a vibration state of the device, said apparatus comprising:

image blur correction means for correcting an image blur;

a stepping motor for operating said image blur correction means;

a counter;

signal generation means for generating a pulse signal for activating said stepping motor, said signal generation means generating said pulse signal in accordance with (i) the vibration signal corresponding to the vibration state of the device and (ii) a count value of said counter, said pulse signal comprising an operation signal for causing said image blur correction means to perform an image blur correction operation; and image blur correction operation start control means for (1) moving said stepping motor to a predetermined initial position and (2) resetting said counter at the beginning of said image blur correction operation of said image blur correction means and, upon completion of said (1) moving and said (2) resetting, for (3) starting an operation of said stepping motor in accordance with said pulse signal generated by said signal generation means responsive to said vibration signal and said count value.

2. An apparatus according to claim 1, wherein said control means includes means for controlling the image blur prevention operation of the image blur corrections means by controlling, with an open loop, a displacement of the stepping motor from the predetermined position.

3. An apparatus according to claim 1, further comprising means for generating a start signal for causing the image blur correction means to start the image blur correction operation, and wherein said control means includes means for performing the initial setting operation in accordance with the start signal.

4. An apparatus according to claim 3, wherein said control means includes means for controlling the operation of the image blur corrections means based on a state of the image blur prevention apparatus initially set by said means for generating.

5. An apparatus according to claim 1, wherein said control means includes means for controlling a driving of the stepping motor, and for controlling the image blur correction operation.

6. An apparatus according to claim 1, wherein the image blur corrections means includes image blur prevention optical means for optically preventing image blur.

7. An apparatus according to claim 6, wherein the image blur prevention optical means includes an optical member, and means for moving the optical member to deflect a light beam passing therethrough to prevent image blur.

* * * * *

UNITED STATES PATENT AND TRADEMARK OFFICE
CERTIFICATE OF CORRECTION

PATENT NO. : 5,831,671

DATED : November 3, 1998

INVENTOR(S): TATSUO CHIGIRA, ET AL.                         Page 1 of 3

It is certified that error appears in the above-identified patent and that said Letters Patent is hereby corrected as shown below:

COLUMN 3,

Line 38, "fifth," should read --fifth--.

COLUMN 4,
Line 47, "1f" should read --$1f^1$--; and
Line 61, "in" should read --1n--.

COLUMN 7,
Line 9, "third-projecting" should read --third projecting--;
Line 43, "directions" should read --direction--; and
Line 46, "directions" should read --direction--.

COLUMN 8,
Line 9, "directions" should read --direction--; and
Line 13, "tions" should read --tion--.

COLUMN 9,
Line 27, "pitch" should be deleted; and
Line 44, "in," should read --in--.

COLUMN 11,
Line 11, "12i eof" should read --12e of--.

UNITED STATES PATENT AND TRADEMARK OFFICE
CERTIFICATE OF CORRECTION

PATENT NO. : 5,831,671

DATED : November 3, 1998

INVENTOR(S) : TATSUO CHIGIRA, ET AL.

It is certified that error appears in the above-identified patent and that said Letters Patent is hereby corrected as shown below:

COLUMN 16,
Line 7, "car be" should read --can be--.

COLUMN 17,
Line 21, "step; as" should read --steps as--.

COLUMN 18,
Line 1, "11B" should read --11B)--;
Line 52, "i the" should read --in the--; and
Line 61, " $\phi$." should read --$\phi°$.--.

COLUMN 20,
Line 19, "support" should read --supports--; and
Line 53, "direction" should read --directions--.

COLUMN 24,
Line 36, "since" should be deleted.

COLUMN 25,
Line 41, "driving,circuits" should read --driving circuits--.

COLUMN 28,
Line 15, "to lower" should read --to or lower--.

UNITED STATES PATENT AND TRADEMARK OFFICE
CERTIFICATE OF CORRECTION

PATENT NO. : 5,831,671

DATED : November 3, 1998

INVENTOR(S) : TATSUO CHIGIRA, ET AL.

It is certified that error appears in the above-identified patent and that said Letters Patent is hereby corrected as shown below:

COLUMN 29,
Line 34, "by and" should read --by an--.

COLUMN 30,
Line 45, "corrections" should read --correction--; and
Line 53, "corrections" should read --correction--.

Signed and Sealed this

Fifth Day of October, 1999

Attest:

Q. TODD DICKINSON

Attesting Officer

Acting Commissioner of Patents and Trademarks